(12) United States Patent
Rahman et al.

(10) Patent No.: US 11,563,468 B2
(45) Date of Patent: Jan. 24, 2023

(54) METHOD AND APPARATUS TO ENABLE SEGMENTED CSI REPORTING IN WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/447,808

(22) Filed: Sep. 15, 2021

(65) Prior Publication Data
US 2022/0006494 A1     Jan. 6, 2022

Related U.S. Application Data

(63) Continuation of application No. 16/740,171, filed on Jan. 10, 2020, now Pat. No. 11,128,354.
(Continued)

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0626* (2013.01); *H04B 7/0639* (2013.01);
(Continued)

(58) Field of Classification Search
CPC .. H04B 7/0417; H04B 7/0626; H04B 7/0639; H04L 5/0051; H04W 72/0413; H04W 72/0453; H04W 80/08
See application file for complete search history.

(56) References Cited

U.S. PATENT DOCUMENTS

2007/0100595 A1   5/2007   Earles et al.
2013/0290458 A1   10/2013  Morris et al.
(Continued)

FOREIGN PATENT DOCUMENTS

EP   3300280 A1   3/2018

OTHER PUBLICATIONS

Supplementary European Search Report dated Nov. 22, 2021, in connection with European Application No. 20741560.5, 10 pages.
(Continued)

*Primary Examiner* — Jaison Joseph

(57) ABSTRACT

A method for operating a user equipment (UE) for channel state information (CSI) feedback in a wireless communication system is provided. The method comprises receiving, from a base station (BS), CSI reference signals (CSI-RSs) and CSI feedback configuration information, estimating a channel based on the received CSI-RSs, determining, based on the estimated channel and the CSI feedback configuration information, a number of non-zero coefficients ($K_l^{NZ}$) for each layer (l) of a total number of $\upsilon$ layers, wherein $\upsilon \geq 1$ is a rank value, and a sum of the $K_l^{NZ}$ across each of the $\upsilon$ layers as a total number of non-zero coefficients ($K^{NZ}$), where $K^{NZ} = \Sigma_{l=1}^{\upsilon} K_l^{NZ}$. The method further comprises transmitting, to the BS, the CSI feedback including the $K^{NZ}$ value over an uplink (UL) channel.

20 Claims, 13 Drawing Sheets

Related U.S. Application Data

(60) Provisional application No. 62/831,383, filed on Apr. 9, 2019, provisional application No. 62/817,076, filed on Mar. 12, 2019, provisional application No. 62/812,650, filed on Mar. 1, 2019, provisional application No. 62/811,253, filed on Feb. 27, 2019, provisional application No. 62/795,677, filed on Jan. 23, 2019, provisional application No. 62/793,949, filed on Jan. 18, 2019.

(51) Int. Cl.
*H04L 5/00* (2006.01)
*H04W 72/04* (2009.01)
*H04W 80/08* (2009.01)

(52) U.S. Cl.
CPC ....... *H04L 5/0051* (2013.01); *H04W 72/0413* (2013.01); *H04W 72/0453* (2013.01); *H04W 80/08* (2013.01)

(56) References Cited

U.S. PATENT DOCUMENTS

| | | | |
|---|---|---|---|
| 2015/0131563 A1 | 5/2015 | Guo et al. | |
| 2018/0034519 A1* | 2/2018 | Rahman | H04B 7/0452 |
| 2018/0076870 A1 | 3/2018 | Kim et al. | |
| 2018/0278437 A1* | 9/2018 | Davydov | H04B 7/0632 |
| 2020/0343956 A1* | 10/2020 | Rahman | H04B 7/0486 |

OTHER PUBLICATIONS

Ericsson, "On CSI enhancements for MU-MIMO," R1-1900757, 3GPP TSG RAN WG1 Meeting Ad-Hoc Meeting 1901, Taipei, Taiwan, Jan. 21-25, 2019, 12 pages.
Huawei, et al., "Discussion on CSI enhancement," R1-1901566, 3GPP TSG RAN WG1 Meeting #96, Athens, Greece, Feb. 25-Mar. 1, 2019, 17 pages.
ZTE, "CSI Enhancement for MU-MIMO Support," R1-1901633, 3GPP TSG RAN WG1 Meeting #96, Athens, Greece, Feb. 25-Mar. 1, 2019, 15 pages.
"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 141 pages.
"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, 121 pages.
"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, 326 pages.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, 82 pages.
"LTE; Evolved Universal Terrestrial Radio Access (E-UTRA); Radio Resource Control (RRC); Protocol specification", 3GPP TS 36.331 V13.0.0 Release 13, Jan. 2016, 670 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for data (Release 15)", 3GPP TS 38.214 V15.4.0, Dec. 2018, 102 pages.
Notification of Transmittal of the International Search Report and the Written Opinion of the International Searching Authority, or the Declaration dated Apr. 29, 2020 in connection with International Patent Application No. PCT/KR2020/000882, 9 pages.
Communication pursuant to Article 94(3) EPC dated Apr. 30, 2020 in connection with European Patent Application No. 16 848 865.8, 4 pages.
'5G'; NR Physical layer procedures for data (3GPP TS 38.214 version 15.3.0 Release 15), ETSI TS 138 214 V15.3.0 (Oct. 2018), 99 pages.

* cited by examiner

METHOD AND APPARATUS TO ENABLE SEGMENTED CSI REPORTING IN WIRELESS COMMUNICATION SYSTEMS

CROSS-REFERENCE TO RELATED APPLICATIONS AND CLAIM OF PRIORITY

This application is a continuation of U.S. patent application Ser. No. 16/740,171, filed on Jan. 10, 2020, which claims priority to U.S. Provisional Patent Application No. 62/793,949, filed on Jan. 18, 2019, U.S. Provisional Patent Application No. 62/795,677, filed on Jan. 23, 2019, U.S. Provisional Patent Application No. 62/811,253, filed on Feb. 27, 2019, U.S. Provisional Patent Application No. 62/812,650, filed on Mar. 1, 2019, U.S. Provisional Patent Application No. 62/817,076, filed on Mar. 12, 2019, and U.S. Provisional Patent Application No. 62/831,383, filed on Apr. 9, 2019. The content of the above-identified patent documents is incorporated herein by reference.

TECHNICAL FIELD

The present disclosure relates generally to wireless communication systems and more specifically to channel state information (CSI) feedback to represent a downlink channel.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for CSI reporting in a wireless communication system.

In one embodiment, a UE for CSI feedback in a wireless communication system is provided. The UE includes a transceiver configured to receive, from a BS, CSI reference signals (CSI-RSs) and CSI feedback configuration information. The UE further includes a processor operably coupled to the transceiver. The processor is configured to estimate a channel based on the received CSI-RSs, and determine, based on the estimated channel and the CSI feedback configuration information, a number of non-zero coefficients ($K_l^{NZ}$) for each layer (l) of a total number of υ layers, wherein υ≥1 is a rank value, and a sum of the $K_l^{NZ}$ across each of the υ layers as a total number of non-zero coefficients ($K^{NZ}$), where $K^{NZ} = \Sigma_{l=1}^{\upsilon} K_l^{NZ}$. The transceiver is further configured to transmit, to the BS, the CSI feedback including a value for the $K^{NZ}$ over an uplink (UL) channel.

In another embodiment, a BS in a wireless communication system is provided. The BS includes a processor configured to generate CSI feedback configuration information. The BS further includes a transceiver operably coupled to the processor. The transceiver is configured to transmit, to a UE, CSI-RSs and the CSI feedback configuration information, and receive, from the UE over an UL channel, a CSI feedback including a value for a total number of non-zero coefficients ($K^{NZ}$) that is a sum of a number of non-zero coefficients ($K_l^{NZ}$) across each layer (l) of a total number of υ layers, where the CSI feedback is based on the CSI-RSs and the CSI feedback configuration information, $K^{NZ} = \Sigma_{l=1}^{\upsilon} K_l^{NZ}$, $K_l^{NZ}$ is a number of non-zero coefficients for layer l, and υ≥1 is a rank value.

In yet another embodiment, a method for operating a UE for CSI feedback in a wireless communication system is provided. The method comprises receiving, from a BS, CSI reference signals (CSI-RSs) and CSI feedback configuration information, estimating a channel based on the received CSI-RSs, determining, based on the estimated channel and the CSI feedback configuration information, a number of non-zero coefficients ($K_l^{NZ}$) for each layer (l) of a total number of υ layers, wherein υ≥1 is a rank value, and a sum of the $K_l^{NZ}$ across each of the υ layers as a total number of non-zero coefficients ($K^{NZ}$), where $K^{NZ} = \Sigma_{l=1}^{\upsilon} K_l^{NZ}$, and transmitting, to the BS, the CSI feedback including the $K^{NZ}$ value over an UL channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
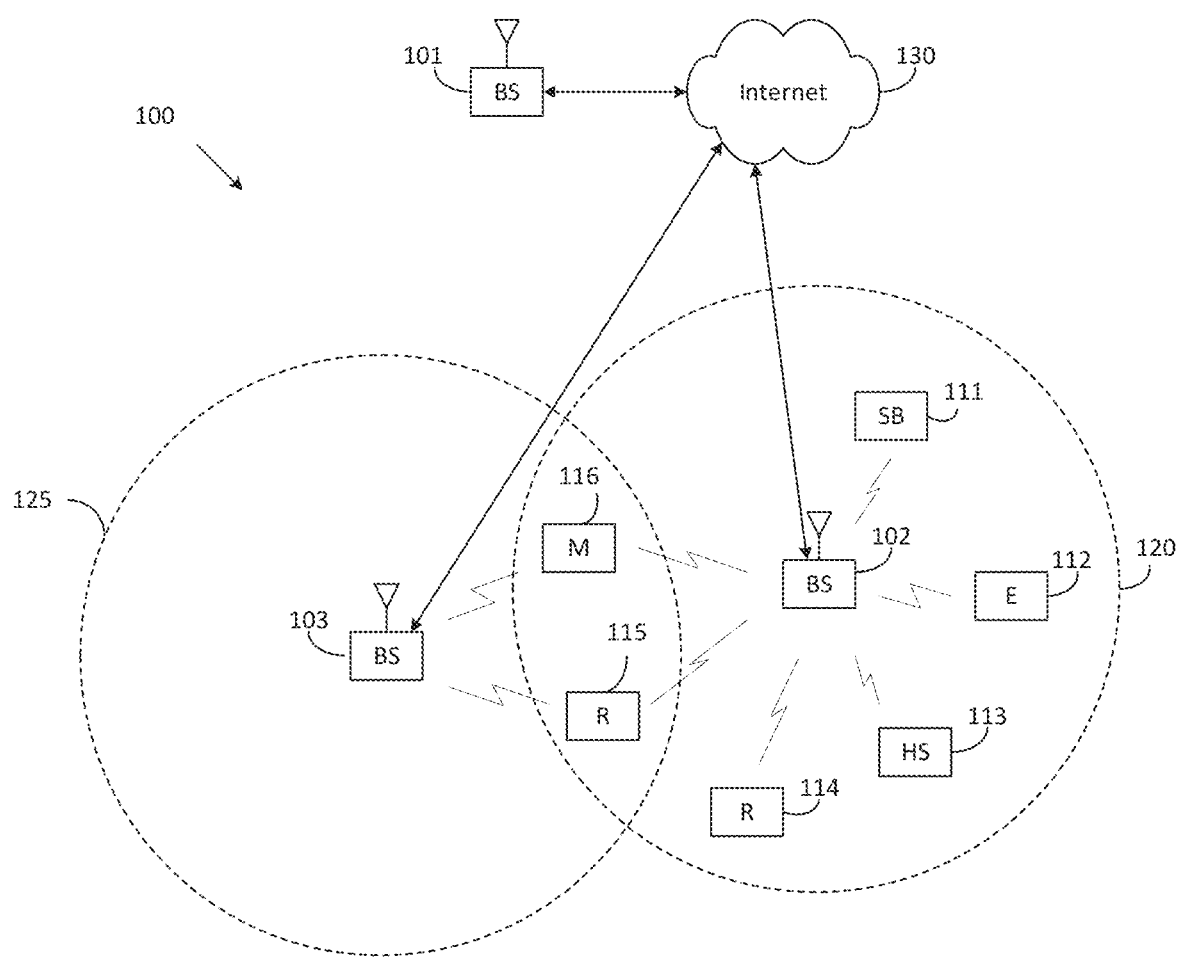
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v15.8.0, "E-UTRA, Physical channels and modulation;" 3GPP TS 36.212 v15.8.0, "E-UTRA, Multiplexing and Channel coding;" 3GPP TS 36.213 v15.8.0, "E-UTRA, Physical Layer Procedures;" 3GPP TS 36.321 v15.8.0, "E-UTRA, Medium Access Control (MAC) protocol specification;" 3GPP TS 36.331 v15.8.0, "E-UTRA, Radio Resource Control (RRC) protocol specification;" 3GPP TR 22.891 v14.2.0; 3GPP TS 38.211 v15.7.0, "E-UTRA, NR, Physical channels and modulation;" 3GPP TS 38.213 v15.7.0, "E-UTRA, NR, Physical Layer Procedures for control;" 3GPP TS 38.214 v15.7.0, "E-UTRA, NR, Physical layer procedures for data;" and 3GPP TS 38.212 v15.7.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
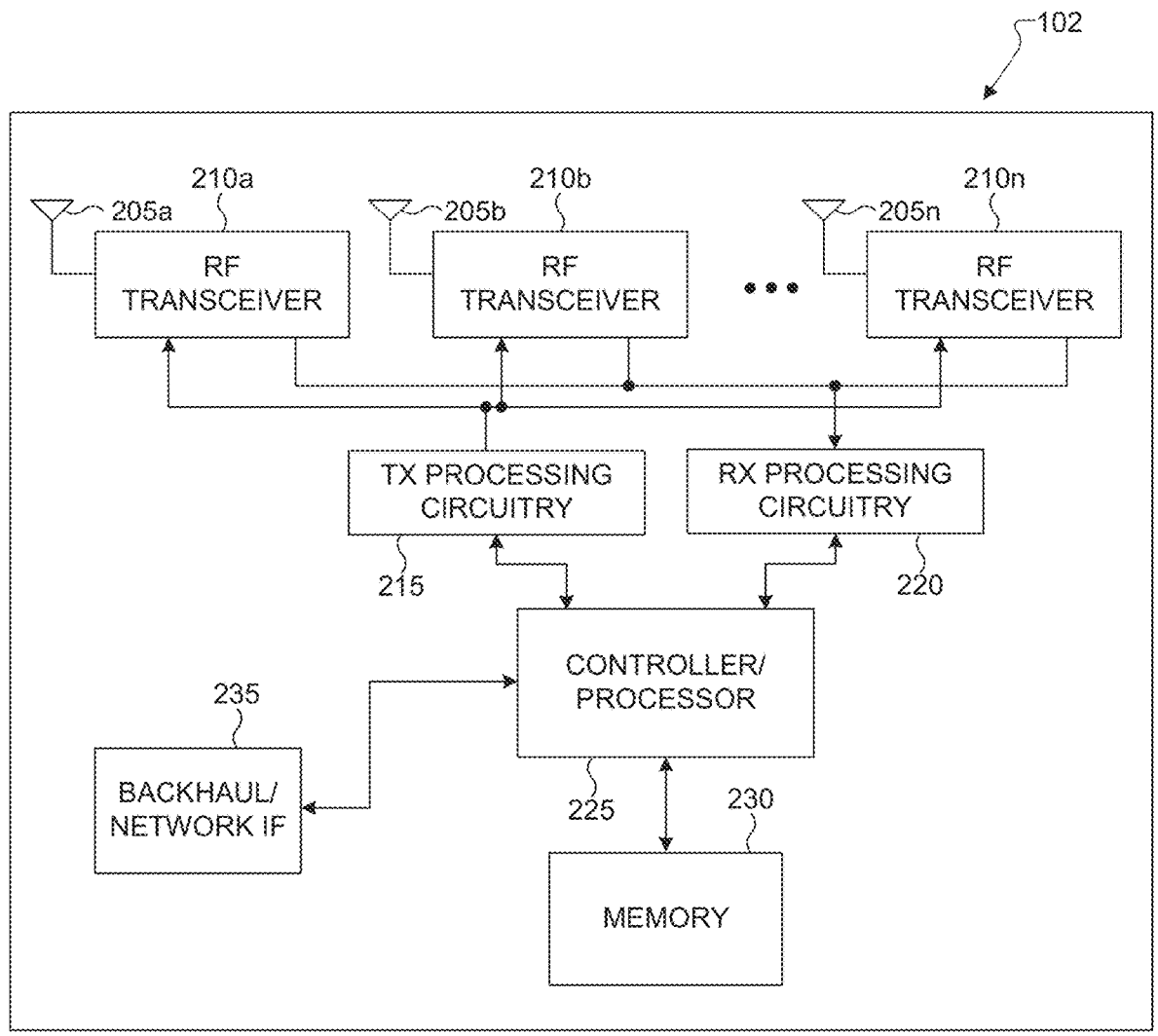
FIG. 2 illustrates an example gNB according to embodiments of the present disclosure.
Figure 3:
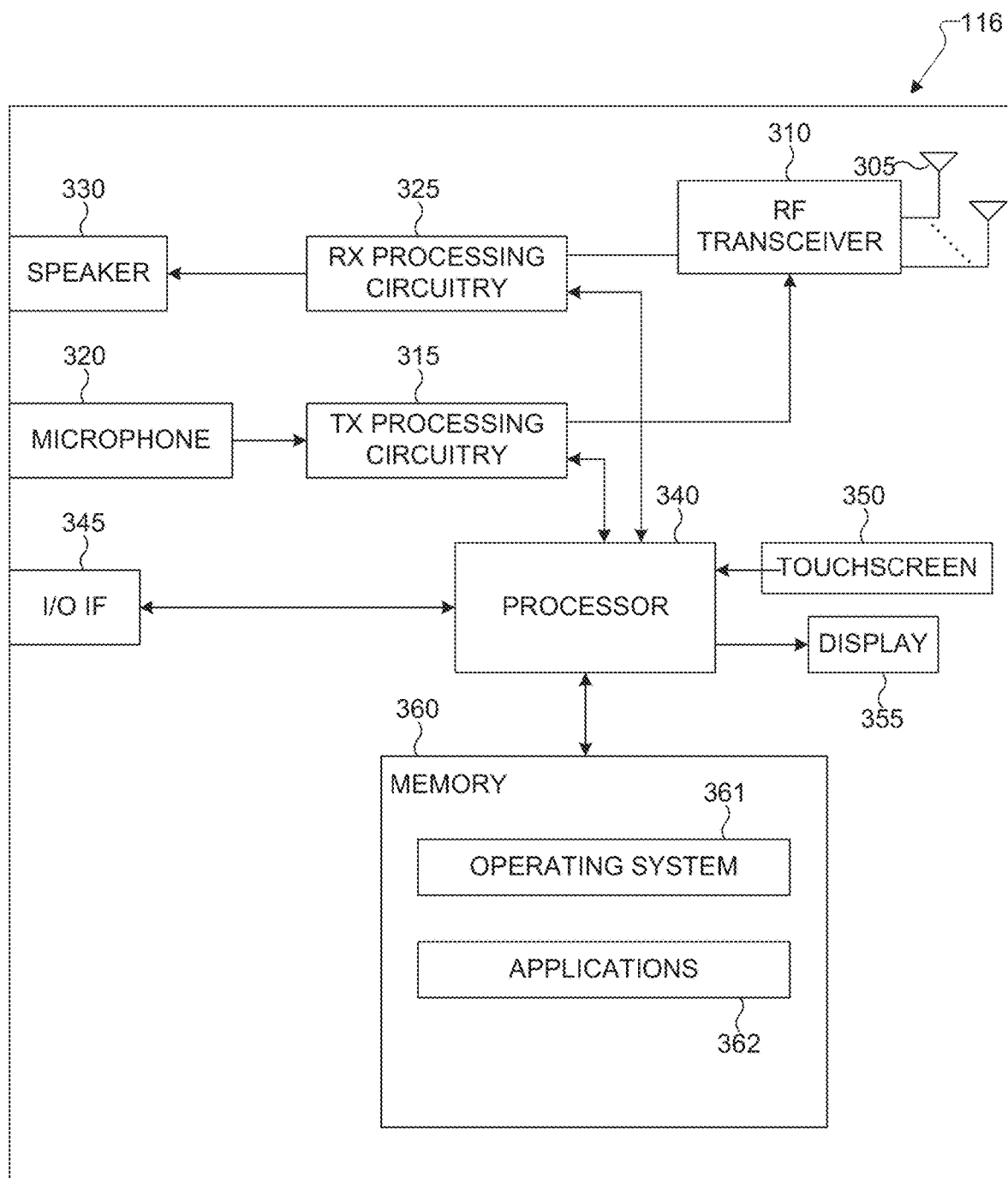
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNB s 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an UL transmission based on an UL codebook in an advanced wireless communication system. In certain embodiments, and one or more of the gNBs 101-103 includes circuitry, programing, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI feedback on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
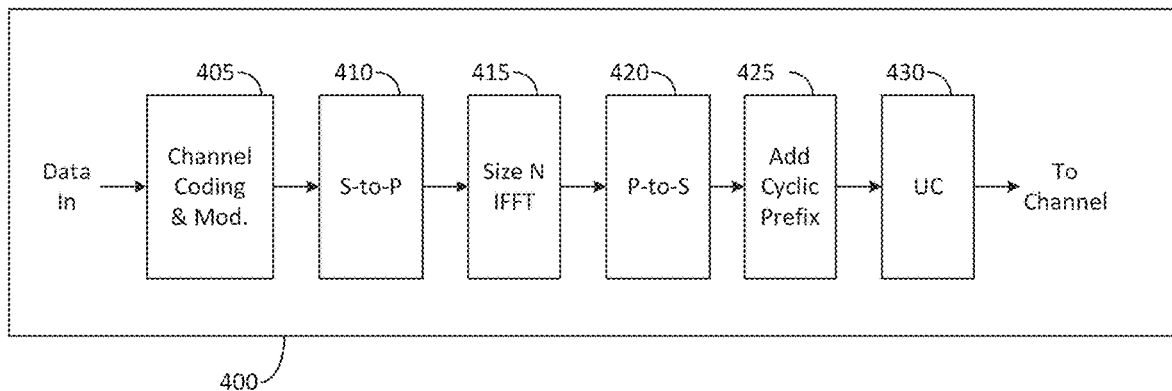
FIG. 4A illustrates a high-level diagram of an orthogonal frequency division multiple access transmit path according to embodiments of the present disclosure.
Figure 4B:
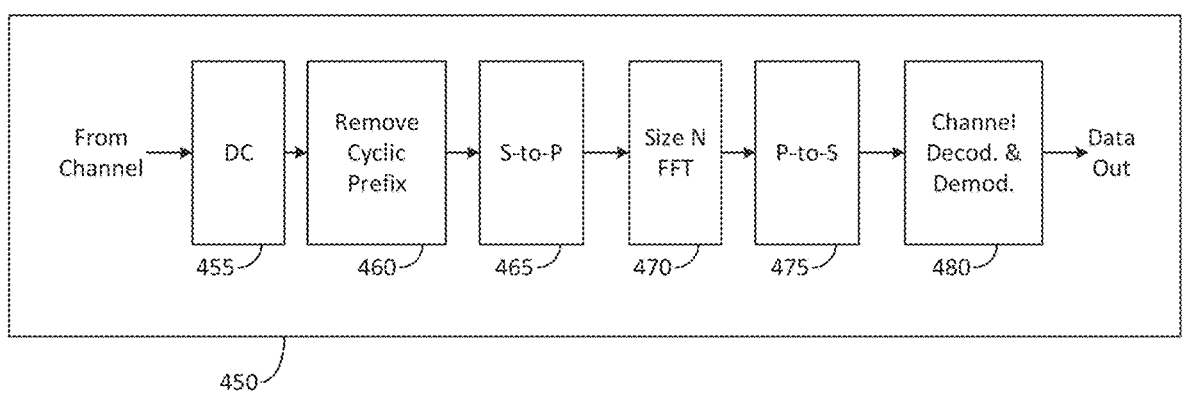
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BS s) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
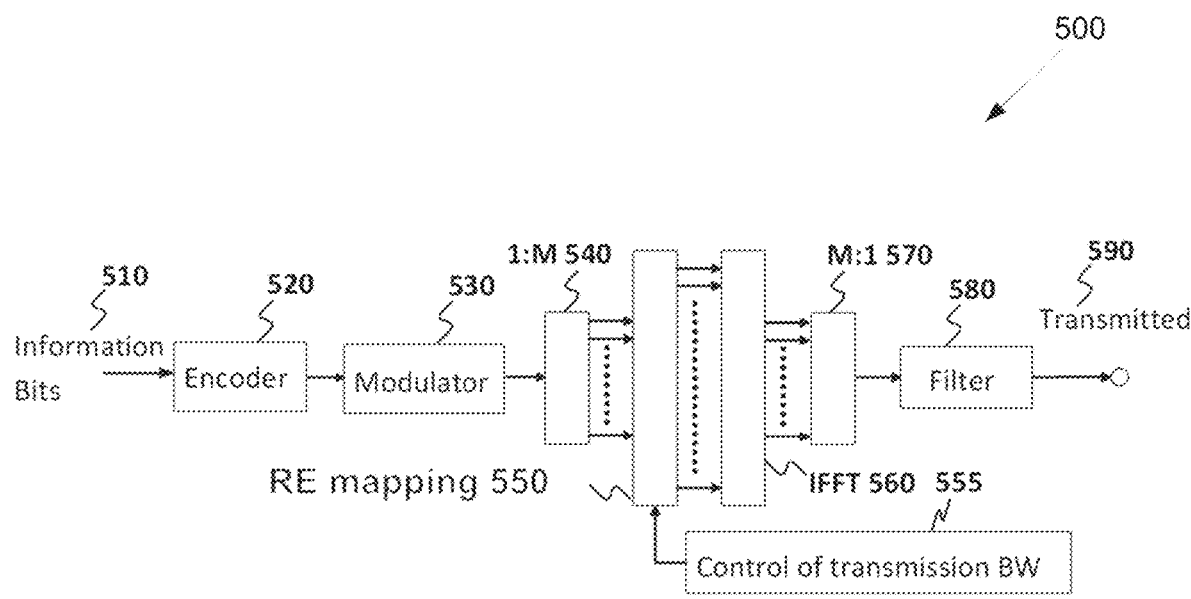
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
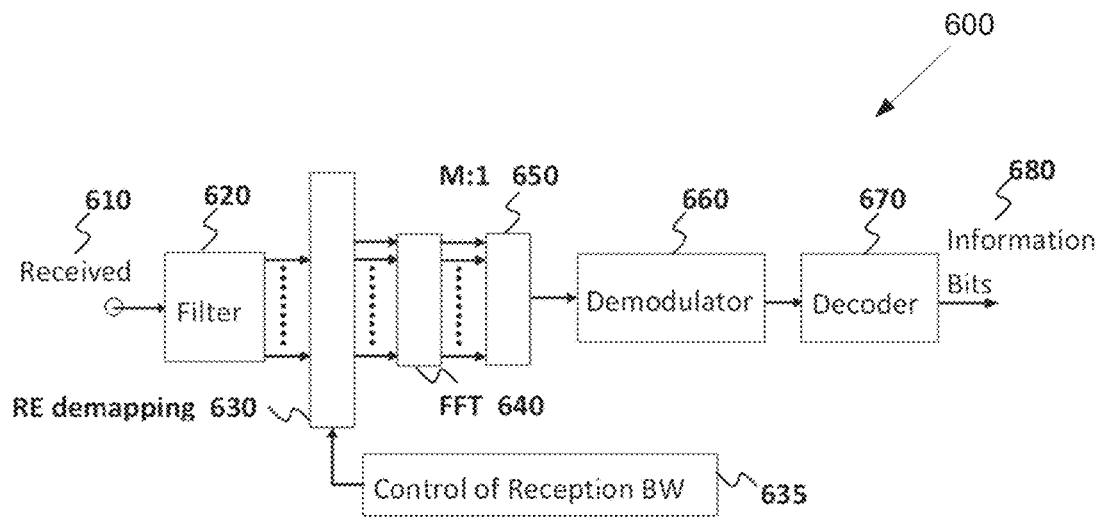
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
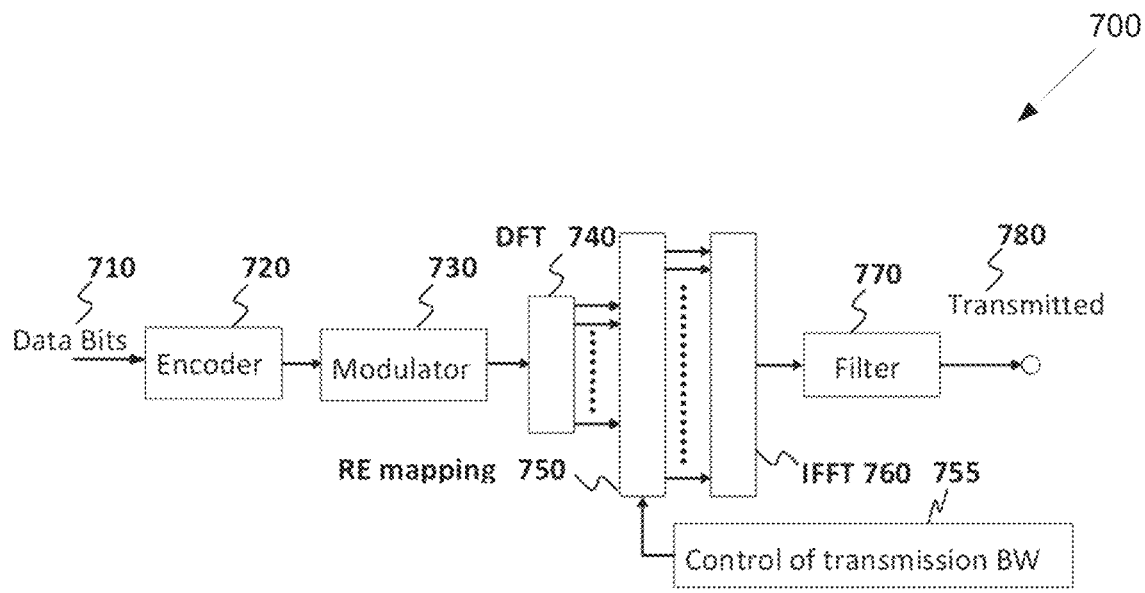
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
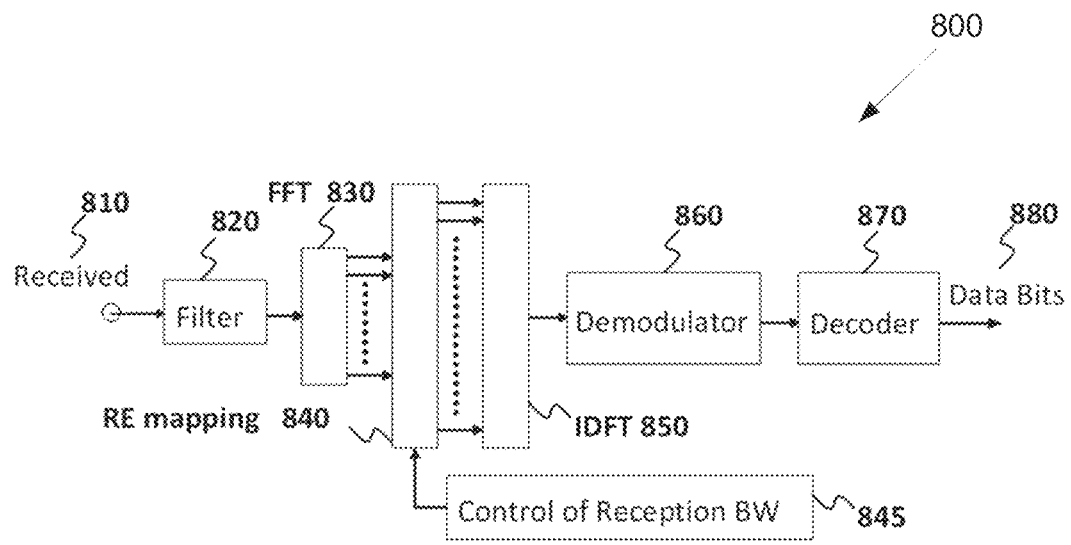
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
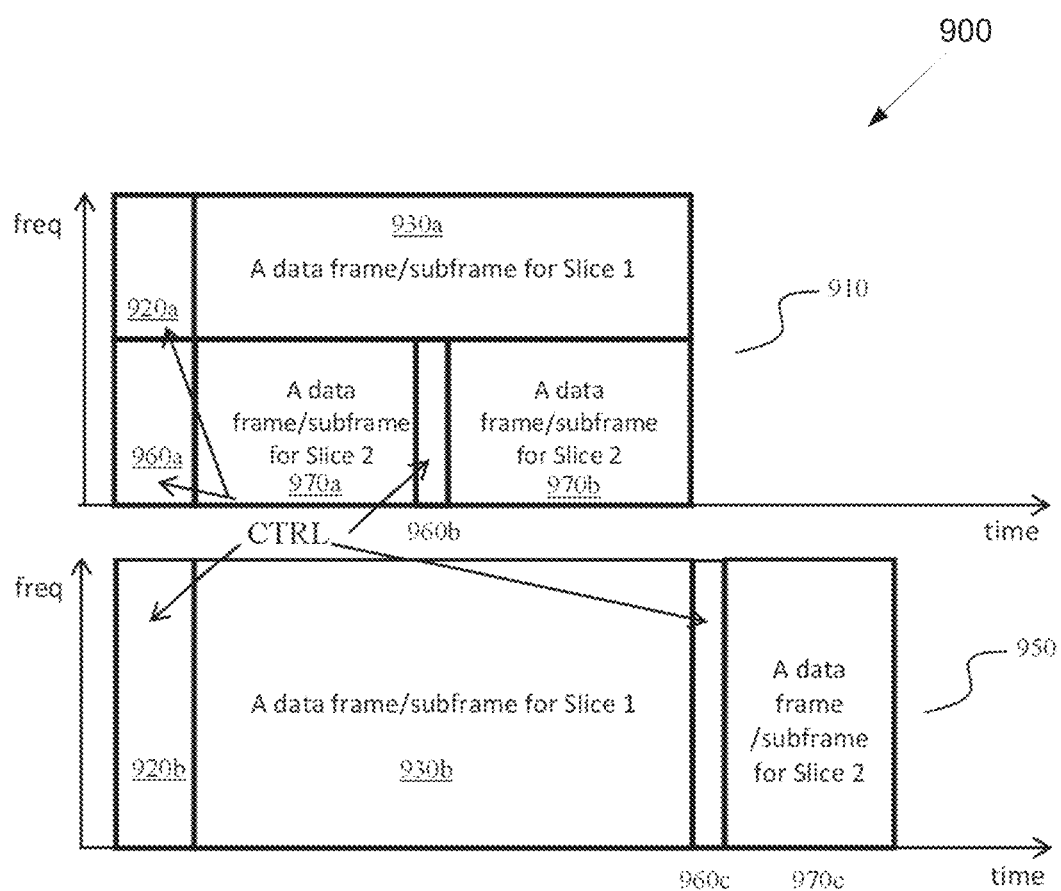
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
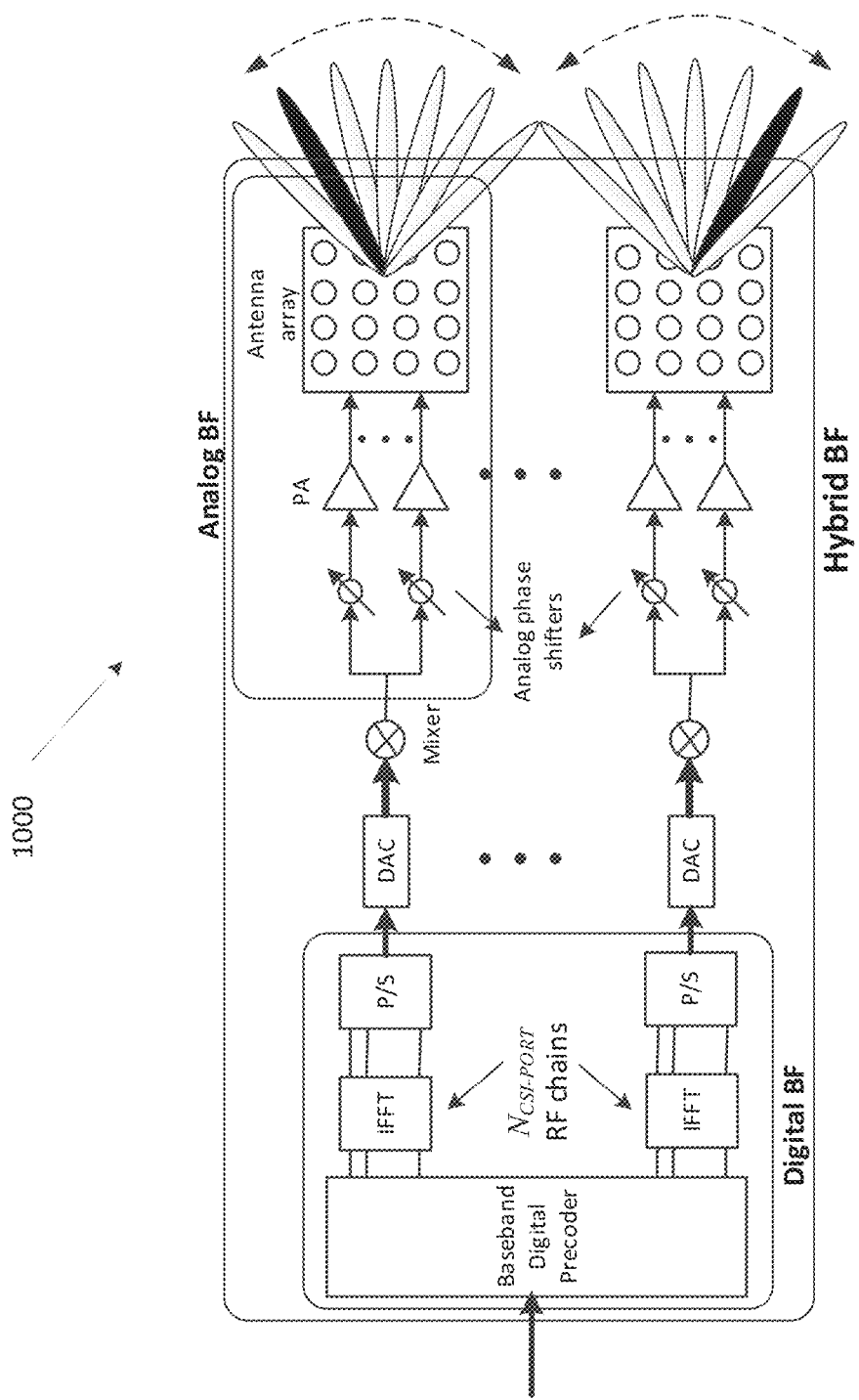
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
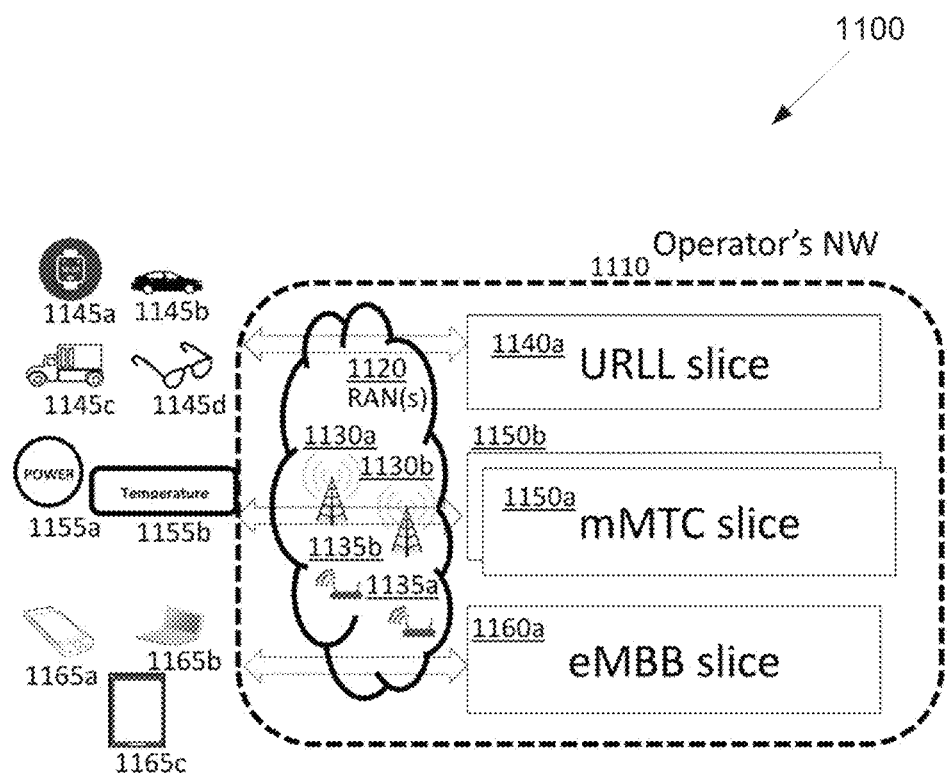
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130*a* and 1130*b*, small cell base stations (femto/pico gNBs or Wi-Fi access points) 1135*a* and 1135*b*. The network 1110 can support various services, each represented as a slice.

In the example, an URLL slice 1140*a* serves UEs requiring URLL services such as cars 1145*b*, trucks 1145*c*, smart watches 1145*a*, and smart glasses 1145*d*. Two mMTC slices 1150*a* and 550*b* serve UEs requiring mMTC services such as power meters 555*b*, and temperature control box 1155*b*. One eMBB slice 1160*a* serves UEs requiring eMBB services such as cells phones 1165*a*, laptops 1165*b*, and tablets 1165*c*. A device configured with two slices can also be envisioned.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI- RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≥T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO.

Figure 12:
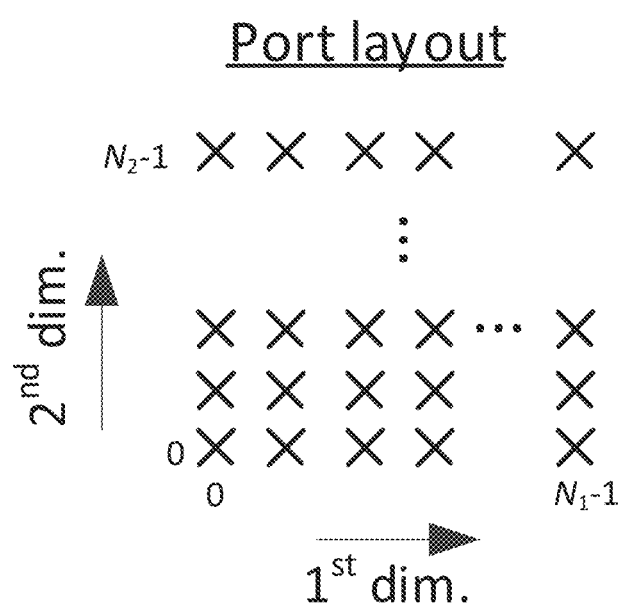
FIG. 12 illustrates an antenna port layout according to embodiments of the present disclosure.

FIG. 12 illustrates an antenna port layout 1200, where $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. So, for a dual-polarized antenna port layout, the total number of antenna ports is $2N_1N_2$.

As described in U.S. patent application Ser. No. 15/490,561, filed Apr. 18, 2017 and entitled "Method and Apparatus for Explicit CSI Reporting in Advanced Wireless Communication Systems," which is incorporated herein by reference in its entirety, a UE is configured with high-resolution (e.g. Type II) CSI reporting in which the linear combination based Type II CSI reporting framework is extended to include a frequency dimension in addition to the first and second antenna port dimensions.

Figure 13:
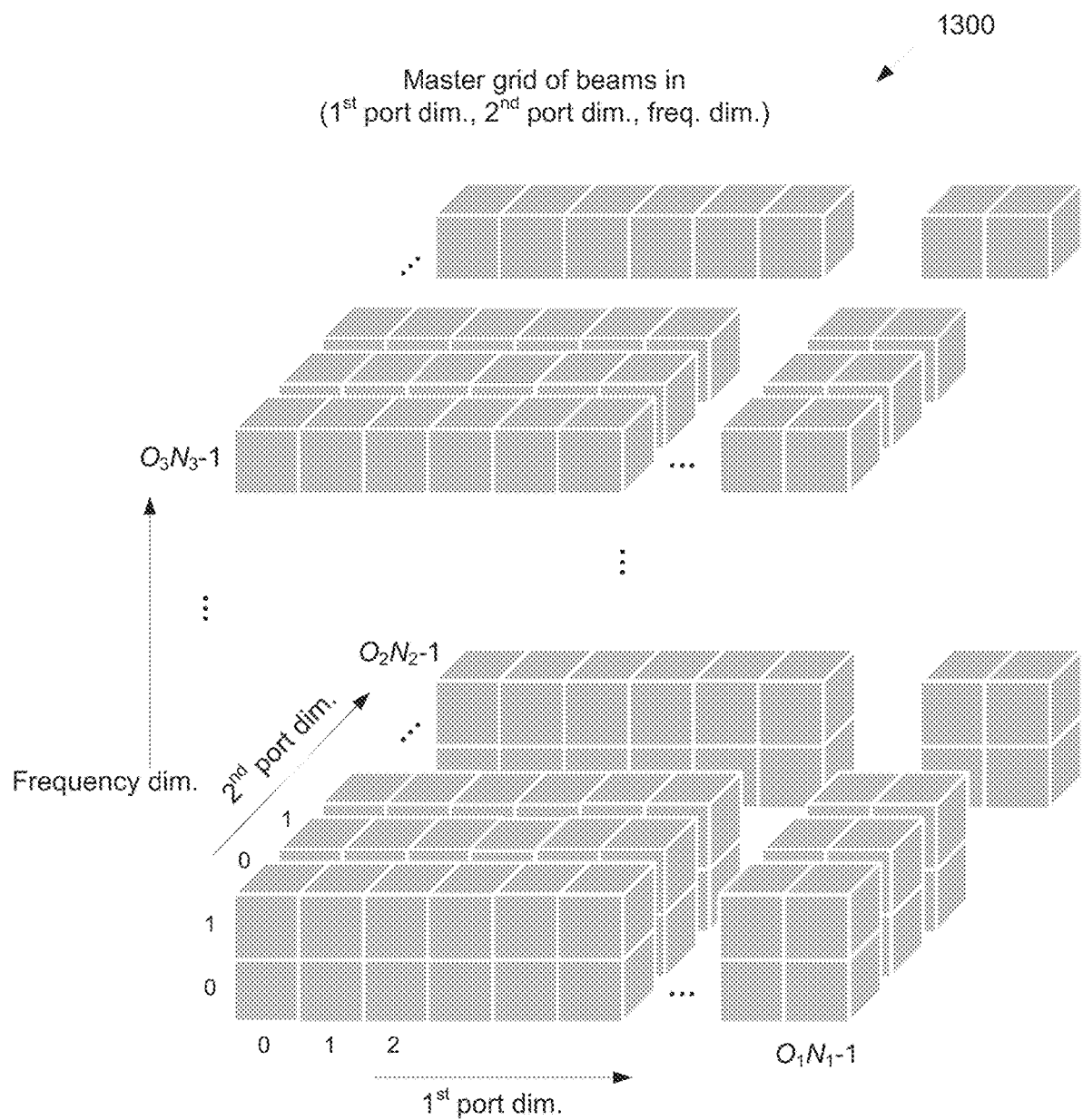
FIG. 13 illustrates a 3D grid of oversampled DFT beams according to embodiments of the present disclosure.

FIG. 13 illustrates a 3D grid 1300 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all SBs and for a given layer l=1, . . . , ν, where ν is the associated RI value, is given by either $$W^l = AC_l B^H = [a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \quad (\text{Eq. 1})$$

$$\sum_{m=0}^{M-1} \sum_{i=0}^{L-1} c_{l,i,m}(a_i b_m^H) = \sum_{i=0}^{L-1} \sum_{m=0}^{M-1} c_{l,i,k}(a_i b_m^H),$$

or $$W^l = \begin{bmatrix} A & 0 \\ 0 & A \end{bmatrix} C_l B^H = \quad (\text{Eq. 2})$$

$$\begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H =$$

$$\begin{bmatrix} \sum_{m=0}^{M-1} \sum_{i=0}^{L-1} c_{l,i,m}(a_i b_m^H) \\ \sum_{m=0}^{M-1} \sum_{i=0}^{L-1} c_{l,i+L,m}(a_i b_m^H) \end{bmatrix},$$

where
- $N_1$ is a number of antenna ports in a first antenna port dimension,
- $N_2$ is a number of antenna ports in a second antenna port dimension,
- $N_3$ is a number of SBs or frequency domain (FD) units/components for PMI reporting (that comprise the CSI reporting band), which can be different (e.g. less than) from a number of SBs for CQI reporting.
- $a_i$ is a $2N_1N_2 \times 1$ (Eq. 1) or $N_1N_2 \times 1$ (Eq. 2) column vector,
- $b_k$ is a $N_3 \times 1$ column vector,
- $c_{l,i,k}$ is a complex coefficient.

In a variation, when a subset K<2LM coefficients (where K is either fixed, configured by the gNB or reported by the UE), then the coefficient in precoder equations Eq. 1 or Eq. 2 is replaced with $v_{l,i,k} \times c_{l,i,m}$, where
- $v_{l,i,m}=1$ if the coefficient $c_{l,i,m}$ is reported by the UE according to some embodiments of this disclosure.
- $v_{l,i,m}=0$ otherwise (i.e., is not reported by the UE).

The indication whether $v_{l,i,m}=1$ or 0 is according to some embodiments of this disclosure.

In a variation, the precoder equations Eq. 1 or Eq. 2 are respectively generalized to $$W^l = \sum_{i=0}^{L-1} \sum_{m=0}^{M-1} c_{l,i,m}(a_i b_{i,m}^H) \quad \text{(Eq. 3)}$$

and $$W^l = \begin{bmatrix} \sum_{i=0}^{L-1} \sum_{m=0}^{M-1} c_{l,i,m}(a_i b_{i,m}^H) \\ \sum_{i=0}^{L-1} \sum_{m=0}^{M_i-1} c_{l,i+L,m}(a_i b_{i,m}^H) \end{bmatrix}, \quad \text{(Eq. 4)}$$

where for a given i, the number of basis vectors is $M_i$ and the corresponding basis vectors are $\{b_{i,m}\}$. Note that $M_i$ is the number of coefficients reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($\upsilon = R$), the pre-coding matrix is given by $$W^{(R)} = \frac{1}{\sqrt{R}}[W^1 \ W^2 \ \cdots \ W^R].$$

Eq. 2 is assumed in the rest of the disclosure. The embodiments of the disclosure, however, are general and are also applicable to Eq. 1, Eq. 3 and Eq. 4.

Here $L \leq 2N_1N_2$ and $K \leq N_3$. If $L=2N_1N_2$, then A is an identity matrix, and hence not reported. Likewise, if $K=N_3$, then B is an identity matrix, and hence not reported. Assuming $L<2N_1N_2$, in an example, to report columns of A, the oversampled DFT codebook is used. For instance, $a_i = v_{l,m}$, where the quantity $v_{l,m}$ is given by:

$$u_m = \begin{cases} \begin{bmatrix} 1 \ e^{j\frac{2\pi m}{O_2 N_2}} \ \cdots \ e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m \ e^{j\frac{2\pi l}{O_1 N_1}} u_m \ \cdots \ e^{j\frac{2\pi l(N_1-1)}{O_1 N_1}} u_m \end{bmatrix}^T$$

Similarly, assuming $K<N_3$, in an example, to report columns of B, the oversampled DFT codebook is used. For instance, $b_k = w_k$, where the quantity $w_k$ is given by:

$$w_k = \begin{bmatrix} 1 \ e^{j\frac{2\pi k}{O_3 N_3}} \ \cdots \ e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[w_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases},$$

and $K=N_3$, and $m=0, \ldots, N_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to 'TypeII-PortSelection-Compression' or 'TypeIII-PortSelection' for an enhanced Type II CSI reporting with port selection in which the pre-coders for all SBs and for a given layer $l=1, \ldots, \nu$, where $\nu$ is the associated RI value, is given by $W^l = AC_l B^H$, where $N_1$, $N_2$, $N_3$, and $c_{l,i,k}$ are defined as above except that the matrix A comprises port selection vectors. For instance, the L antenna ports per polarization or column vectors of A are selected by the index $q_1$, where $$q_1 \in \left\{0, 1, \ldots, \left\lceil \frac{P_{CSI-RS}}{2d} \right\rceil - 1\right\} \left(\text{this requires } \left\lceil \log_2 \left\lceil \frac{P_{CSI-RS}}{2d} \right\rceil \right\rceil \text{bits}\right),$$

and the value of d is configured with the higher layer parameter PortSelectionSamplingSize, where $$d \in \{1, 2, 3, 4\} \text{ and } d \leq \min\left(\frac{P_{CSI-RS}}{2}, L\right).$$

To report columns of A, the port selection vectors are used. For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

On a high level, a precoder $W^l$ can be described as follows.

$$W = AC_l B^H = W_1 \tilde{W}_2 W_f^H,$$

where $A=W_1$ corresponds to the $W_1$ in Type II CSI codebook, and $B=W_f$. The $C=\tilde{W}_2$ matrix includes all the required linear combination coefficients (e.g. amplitude and phase or real or imaginary).

This disclosure proposes a few embodiments about (1) N3 and (2) precoders comprising multiple segments (groupings) in either spatial domain (SD) or frequency domain (FD) or both.

In one embodiment 1A, N3 is unrestricted and can take all possible values. For example, if a number of SBs for PMI reporting T=R×S where S=$N_{SB}$=number of SBs for CQI reporting belonging to {3, 4, . . . , 19}, where R≥1, then N3 can take any value from {3R, 4R, . . . ,19R}. In one example, R=1 or 2.

In one embodiment 1B, N3 is restricted and takes a value that satisfies a certain condition. A few examples of the certain condition are as follows.

In one example, the certain condition corresponds to the following:

$N_3$=the smallest candidate value for N3 such that $N_3 \geq T$.

In another example, the certain condition corresponds to the following:

$N_3$=the smallest candidate value for N3 such that $N_3 \geq T$.
The last ($N_3$−T+1 though $N_3$) T columns of the precoder $W^l$ correspond to the precoders for T SBs or FD units for which the UE is configured to report the PMIs, and the remaining (1 through $N_3$−T) columns of the precoder $W^l$ are either ignored or correspond to the precoders for $N_3$−T SBs (for PMI reporting) that come before the ($N_3$−T+1)-th SB, e.g. 1, 2, . . . , $N_3$−T.

In another example, the certain condition corresponds to the following:

$N_3$=the smallest candidate value for N3 such that $N_3 \geq T$.
The first (1 though T) T columns of the precoder $W^l$ correspond to the precoders for T SBs or FD units for which the UE is configured to report the PMIs, and the remaining (T+1 through $N_3$) columns of the precoder $W^l$ are either ignored or correspond to the precoders for $N_3$−T SBs (for PMI reporting) that come after the T-th SB, e.g. T+1, T+2, . . . , $N_3$.

In another example, the certain condition corresponds to the following:

$N_3$=the smallest candidate value for N3 such that $N_3 \geq T$.
The ($x_1$+1 through $N_3$−$x_2$=$x_1$+T) T columns of the precoder $W^l$ correspond to the precoders for T SBs or FD units for which the UE is configured to report the PMIs, $x_1$ of the remaining (1 through $x_1$) columns of the precoder $W^l$ are either ignored or correspond to the precoders for $x_1$ SBs (for PMI reporting) that come before the ($x_1$+1)-th SB, e.g. 1, 2, . . . , $x_1$, and $x_2$ of the remaining (T+$x_1$+1 through $N_3$) $x_2$ columns of the precoder $W^l$ are either ignored or correspond to the precoders for $x_2$ SBs (for PMI reporting) that come after the (T+$x_1$)-th SB, e.g. T+$x_1$+1, T+$x_1$+2, . . . , $N_3$.
Where $$x_1 = \left\lceil \frac{(N_3 - T)}{2} \right\rceil \text{ and } x_2 = N_3 - T - \left\lceil \frac{(N_3 - T)}{2} \right\rceil = N_3 - T - x_1, \text{ or } x_1 =$$

$$\left\lfloor \frac{(N_3 - T)}{2} \right\rfloor \text{ and } x_2 = N_3 - T - \left\lfloor \frac{(N_3 - T)}{2} \right\rfloor = N_3 - T - x_1, \text{ or } x_2 =$$

$$\left\lceil \frac{(N_3 - T)}{2} \right\rceil \text{ and } x_1 = N_3 - T - \left\lceil \frac{(N_3 - T)}{2} \right\rceil = N_3 - T - x_2, \text{ or } x_2 =$$

$$\left\lfloor \frac{(N_3 - T)}{2} \right\rfloor \text{ and } x_1 = N_3 - T - \left\lfloor \frac{(N_3 - T)}{2} \right\rfloor = N_3 - T - x_2.$$

At least one of the following alternatives is used for the candidate $N_3$ value.

In one alternative Alt 1B-0, N3 is a multiple of 2, i.e., N3 belongs to {2, 4, 8, 16, 32, . . . }. At least one of the following examples is used.

In one example Ex 1B-0-0 (R=1): if the number of SBs for PMI reporting T=S, where S=the number of SBs for CQI reporting belonging to {3, 4, . . . , 19}, then $N_3 \in$ {4, 8, 16, 32}.

In one example Ex 1B-0-1 (R=2): if the number of SBs for PMI reporting T=R×S=2S, where S=the number of SBs for CQI reporting belonging to {6, 8, . . . , 38}, then $N_3$ E {8, 16, 32, 64}.

In one alternative Alt 1B-1, N3 is a multiple of 2 or 3, i.e., N3 belongs to {2, 3, 4, 6, 8, 9, 12, 16, 18, 24, 27, 32, 36, . . . }. At least one of the following examples is used.

In one example Ex 1B-1-0 (R=1): if number of SBs for PMI reporting T=S, where S=number of SBs for CQI reporting belonging to {3, 4, . . . , 19}, then $N_3 \in$ {3, 4, 6, 8, 9, 12, 16, 18, 24}.

In one example Ex 1B-1-1 (R=2): if number of SBs for PMI reporting T=R×S=2S, where S=number of SBs for CQI reporting belonging to {6, 8, . . . , 38}, then $N_3 \in$ {6, 8, 9, 12, 16, 18, 24, 27, 32, 36, 48}.

In one alternative Alt 1B-2, N3 is a multiple of 2 or 3 or 5, i.e., N3 belongs to {2, 3, 4, 5, 6, 8, 9, 10, 12, 15, 16, 18, 20, 24, 25, 27, 30, 32, . . . }. At least one of the following examples is used.

In one example Ex 1B-2-0 (R=1): if number of SBs for PMI reporting T=S, where S=number of SBs for CQI reporting belonging to {3, 4, . . . , 19}, then $N_3 \in$ {3, 4, 5, 6, 8, 9, 10, 12, 15, 16, 18, 20}.

Ex 1B-2-1 (R=2): if number of SBs for PMI reporting T=R×S=2S, where S=number of SBs for CQI reporting belonging to {6, 8, . . . , 38}, then $N_3 \in$ {6, 8, 9, 10, 12, 15, 16, 18, 20, 24, 25, 27, 30, 32, 36, 40}.

In one embodiment 1C, N3 is configured (e.g., via higher layer RRC signaling). The set of candidate values for N3 is according to one of examples in embodiment 1A/1B, and is either fixed, or optionally, higher layer configured.

In one embodiment 1D, the value N3 is determined based on a condition on T=$N_{SB}$×R=S×R such that:

$N_3$ is according to Alt 1A if T≤α, and
$N_3$ is according to one of the alternatives or examples in Alt 1B if T>α, where α is a fixed number. In one example, α is a prime number, e.g., α=13 or 17 or 19. In one example of this embodiment, α=13, and $N_3$ is according to Alt 1A, i.e., $N_3$=T=$N_{SB}$×R if T≤13, and
$N_3$ is according to Alt 1B-2 if T>13, i.e., $N_3$ is a multiple of 2 or 3 or 5 such that $N_3 \geq T$.

In one embodiment 1E, the value N3 is determined based on a condition on T=$N_{SB}$×R=S×R such that:

$N_3$ is according to Alt 1A if T≤α, and
$N_3$ is according to one of the alternatives or examples in Alt 1B if T>α. In addition,
$N_3$ is segmented into two segments as proposed later in embodiments 2A/2B/2C, where α is a fixed number. In one example, α is a prime number, e.g., α=13 or 17 or 19. In one example of this embodiment, α=13, and $N_3$ is according to Alt 1A, i.e., $N_3$=T=$N_{SB}$×R if T≤13, and
$N_3$ is according to Alt 1B-2 if T>13, i.e., $N_3$ is a multiple of 2 or 3 or 5 such that $N_3 \geq T$. In addition, $N_3$ is segmented into two segments comprising ($N_{3,0}$, $N_{3,1}$) FD components as proposed later in embodiments 2A/2B/2C. An example of $N_3$ values and ($N_{3,0}$, $N_{3,1}$) values in shown in Table 1. For some $N_3$ values, there are multiple ($N_{3,0}$, $N_{3,1}$) values shown in the table as examples. Either only one of them will be used or one of them configured or reported by the UE.

TABLE 1

Example candidate values for $(N_{3,0}, N_{3,1})$ when $T > 13$

| | $T = N_{SB} \times R$ | $N_3$ | $(N_{3,0}, N_{3,1})$ |
|---|---|---|---|
| R = 1 | 14 | 15 | (8, 7), (9, 6), (6, 9) |
| | 15 | 15 | |
| | 16 | 16 | (8, 8) |
| | 17 | 18 | (9, 9) |
| | 18 | 18 | |
| | 19 | 20 | (10, 10) |
| R = 2 | 20 | 20 | |
| | 22 | 24 | (12, 12) |
| | 24 | 24 | |
| | 26 | 27 | (15, 12), (12, 15) |
| | 28 | 30 | (15, 15) |
| | 30 | 30 | |
| | 32 | 32 | (16, 16) |
| | 34 | 36 | (18, 18) |
| | 36 | 36 | |
| | 38 | 40 | (20, 18), (18, 20) |

In one embodiment 1F, the value N3 is determined exactly that same way as in embodiment 1E except that the solution when T>13 is replaced with the following. The $N_3$ value is a multiple of 2 or 3 or 5 such that $N_3 \leq T$. In addition, $N_3$ is segmented into two segments comprising $(N_{3,0}, N_{3,1})$ FD components as proposed later in embodiments 2A/2B/2C. An example of $N_3$ values and $(N_{3,0}, N_{3,1})$ values in shown in Table 2. For some $N_3$ values, there are multiple $(N_{3,0}, N_{3,1})$ values shown in the table as examples. Either only one of them will be used or one of them configured or reported by the UE.

TABLE 2

Example candidate values for $(N_{3,0}, N_{3,1})$ when $T > 13$

| | $T = N_{SB} \times R$ | $N_3$ | $(N_{3,0}, N_{3,1})$ |
|---|---|---|---|
| R = 1 | 14 | 12 | (6, 6) |
| | 15 | 15 | (8, 7), (9, 6), (6, 9) |
| | 16 | 16 | (8, 8) |
| | 17 | 16 | |
| | 18 | 18 | (9, 9) |
| | 19 | 18 | |
| R = 2 | 20 | 20 | (10, 10) |
| | 22 | 20 | |
| | 24 | 24 | (12, 12) |
| | 26 | 25 | (13, 12), (10, 15), (15, 10) |
| | 28 | 27 | (15, 12), (12, 15) |
| | 30 | 30 | (15, 15) |
| | 32 | 32 | (16, 16) |
| | 34 | 32 | |
| | 36 | 36 | (18, 18) |
| | 38 | 36 | |

In embodiment 1G, a UE reports via UE capability signaling that whether it can support all values of N3 (i.e., N3 is unrestricted according to Alt 1A) or only a subset of N3 values (i.e., N3 is restricted according to Alt1B). If the UE supports only a restricted subset of N3 values, then the restricted subset is determined according to at least one of the embodiments 1B, 1C, 1D, or, 1E, or alternatives or examples therein.

In one variation, if the UE supports only a restricted subset of N3 values, then the UE reports the restricted set of N3 values that it supports (e.g., via UE capability signaling).

In another variation, if the UE supports only a restricted subset of N3 values, then the restricted set of N3 values is fixed (e.g., Alt 1B-2 or embodiment 1D or embodiment 1E).

In another variation, if the UE supports only a restricted subset of N3 values, then the UE reports a set of N3 values that it cannot support (e.g., via UE capability signaling). The restricted subset of N3 values that the UE supports corresponds to the set of all N3 values excluding the set of N3 values that the UE cannot support.

In another variation, if the UE supports only a restricted subset of N3 values, then a set of N3 values that the UE cannot support is fixed. The restricted subset of N3 values that the UE supports corresponds to the set of all N3 values excluding the set of N3 values that the UE cannot support.

In one example, if the restricted set of N3 values is according to Alt 1B-2 (i.e., N3 is a multiple of 2 or 3 or 5), then For R=1,
if the number of SBs for PMI reporting T=S, where S=number of SBs for CQI reporting belonging to {3, 4, . . . , 19}; and the UE reports that it can support all values of N3, then $N_3 = T = S \in \{3, 4, \ldots, 19\}$, and
if the number of SBs for PMI reporting T=S, where S=number of SBs for CQI reporting belonging to {3, 4, . . . , 19}; and the UE reports that it can support only a subset of N3 values, then $N_3 \in \{3, 4, 5, 6, 8, 9, 10, 12, 15, 16, 18, 20\}$.

For R=2,
if the number of SBs for PMI reporting T=R×S=2S, where S=number of SBs for CQI reporting belonging to {6, 8, . . . , 38}; and the UE reports that it can support all values of N3, then $N_3 = T = 2S \in \{6, 8, \ldots, 38\}$, and
if number of SBs for PMI reporting T=R×S=2S, where S=number of SBs for CQI reporting belonging to {6, 8, . . . , 38}; and the UE reports that it can support only a subset of N3 values, then $N_3 \in \{6, 8, 9, 10, 12, 15, 16, 18, 20, 24, 25, 27, 30, 32, 36, 40\}$.

In one embodiment 2A, the number of FD compression units, or, the number of SBs for PMI reporting (i.e. length $N_3$ of FD basis vectors $b_m$ in Eq. 2) is divided (segmented or grouped) into multiple segments, and the proposed framework for compression in SD and FD is extended for this segmentation (grouping) of SBs in FD. At least one of the following alternatives is used for number of segments.

In one alternative Alt 2A-1, the number of segments (groups) is fixed, e.g. to 2.

In one alternative Alt 2A-2, the number of segments (groups) is configured (e.g. via higher layer signaling).

In one alternative Alt 2A-3, the number of segments (groups) is reported by the UE. For example, if two-part UCI is used reported CSI, then number of segments is reported in UCI part 1. In another example, it is reported as part of the WB CSI component in UCI part 2.

In one alternative Alt 2A-4, the number of segments (groups) is one by default. But, the number of segments greater than 1 (e.g. 2) can be configured (turned ON) via higher layer signaling.

Let P be the number of segments. Then, a precoder $W^l$ can be described as follows:

$$W = AC_lB^H = W_1\tilde{W}_2W_f^H$$

$W_1 = A$ is according to one of Eq. 1 through 4.

$$W_f = \begin{bmatrix} W_{f,0} & 0 & \cdots & 0 \\ 0 & W_{f,1} & \cdots & 0 \\ \vdots & \vdots & \ddots & \vdots \\ 0 & 0 & \cdots & W_{f,P-1} \end{bmatrix}$$

where $W_{f,p}$ for $p \in \{0, 1, \ldots, P-1\}$ is FD basis for segment p, and is size $M_p \times N_{3,p}$; $M_p$ is number of FD basis vectors for segment p and $N_{3,p}$ is dimension (size) of FD basis vectors comprising columns of $W_{f,p}$.

$C_l = [C_{l,0}\ C_{l,1}\ \ldots\ C_{l,P-1}]$ where $c_{l,p}$ for $p \in \{0, 1, \ldots, P-1\}$ is coefficient matrix segment p, and is size $2L \times M_p$.

The set of values $\{M_p\}$ is according to one of the following.

In one alternative Alt 2A-5: $M_p = M/P$ for all p assuming P divides M. If P does not divide M, then $M_p = \lceil M/P \rceil$ for all $p \in \{0, 1, \ldots, P-2\}$ and $M_p = M-(P-1)\lceil M/P \rceil$ for $p = P-1$.

In one alternative Alt 2A-6: $\{M_p\}$ is configured.

In one alternative Alt 2A-7: $\{M_p\}$ is reported by the UE, but their sum $\Sigma M_p$ is configured.

The set of values $\{N_{3,p}\}$ is according to one of the following.

In one alternative Alt 2A-8: $N_{3,p} = N_3/P$ for all p assuming P divides N3. If P does not divide $N_3$, then $N_{3,p} = \lceil N_3/P \rceil$ for all $p \in \{0, 1, \ldots, P-2\}$ and $N_{3,p} = N_3-(P-1)\lceil N_3/P \rceil$ for $p = P-1$.

In one alternative Alt 2A-9: $\{N_{3,p}\}$ is configured.

In one alternative Alt 2A-10: $\{N_{3,p}\}$ is reported by the UE, but their sum $N_3 = \Sigma N_{3,p}$ is configured.

In one variation, the segmentation is considered regardless of whether SBs for PMI reporting are contiguous or not. In another variation, the segmentation is considered only when SBs for PMI reporting are non-contiguous, i.e., the number of segments=1 for contiguous SBs and >1 (e.g., 2) for non-contiguous SBs. In yet another variation, the segmentation is considered when SBs for PMI reporting are non-contiguous, i.e., the number of segments >1 (e.g., 2) for non-contiguous SBs, and whether or not segmentation is used for contiguous SBs is configurable.

If the number of segments is 2 (P=2), then Eq. (1) for precoder can be extended as follows.

$$W^l = W_1 \tilde{W}_2 W_f^H = AC_l B^H = A[C_{l,0}\ C_{l,1}] \begin{bmatrix} B_0 & 0 \\ 0 & B_1 \end{bmatrix}^H = \qquad \text{(Eq. 5)}$$

$$[a_0\ a_1\ \ldots\ a_{L-1}][C_{l,0}\ C_{l,1}] \begin{bmatrix} b_{0,0}\ b_{0,1}\ \ldots\ b_{0,M_0-1} & 0 \\ 0 & b_{1,0}\ b_{1,1}\ \ldots\ b_{1,M_1-1} \end{bmatrix}^H =$$

$$\sum_{i=0}^{L-1} a_i \left[ \sum_{m=0}^{M_0-1} c_{l,0,i,m} b_{0,m}^H \quad \sum_{m=0}^{M_1-1} c_{l,1,i,m} b_{1,m}^H \right] =$$

$$\left[ \sum_{i=0}^{L-1} \sum_{m=0}^{M_0-1} c_{l,0,i,m}(a_i b_{0,m}^H) \quad \sum_{i=0}^{L-1} \sum_{m=0}^{M_1-1} c_{l,1,i,m}(a_i b_{1,m}^H) \right],$$

Likewise, Eq. (2) can be extended as follows.

$$W^l = W_1 \tilde{W}_2 W_f^H = \begin{bmatrix} A & 0 \\ 0 & A \end{bmatrix} [C_{l,0}\ C_{l,1}] \begin{bmatrix} B_0 & 0 \\ 0 & B_1 \end{bmatrix}^H = \qquad \text{(Eq. 6)}$$

$$\begin{bmatrix} a_0\ a_1\ \ldots\ a_{L-1} & 0 \\ 0 & a_0\ a_1\ \ldots\ a_{L-1} \end{bmatrix} [C_{l,0}\ C_{l,1}] \begin{bmatrix} b_{0,0}\ b_{0,1}\ \ldots\ b_{0,M_0-1} & 0 \\ 0 & b_{1,0}\ b_{1,1}\ \ldots\ b_{1,M_1-1} \end{bmatrix}^H =$$

$$\begin{bmatrix} \sum_{i=0}^{L-1} a_i \left[ \sum_{m=0}^{M_0-1} c_{l,0,i,m} b_{0,m}^H \quad \sum_{m=0}^{M_1-1} c_{l,1,i,m} b_{1,m}^H \right] \\ \sum_{i=0}^{L-1} a_i \left[ \sum_{m=0}^{M_0-1} c_{l,0,i+L,m} b_{0,m}^H \quad \sum_{m=0}^{M_1-1} c_{l,1,i+L,m} b_{1,m}^H \right] \end{bmatrix} =$$

$$\begin{bmatrix} \sum_{i=0}^{L-1} \sum_{m=0}^{M_0-1} c_{l,0,i,m}(a_i b_{0,m}^H) & \sum_{i=0}^{L-1} \sum_{m=0}^{M_1-1} c_{l,1,i,m}(a_i b_{1,m}^H) \\ \sum_{i=0}^{L-1} \sum_{m=0}^{M_0-1} c_{l,0,i+L,m}(a_i b_{0,m}^H) & \sum_{i=0}^{L-1} \sum_{m=0}^{M_1-1} c_{l,1,i+L,m}(a_i b_{1,m}^H) \end{bmatrix},$$

In one embodiment 2C, to quantize $C_l$, the following components are reported.

Strongest coefficient: The index of the strongest coefficient is reported. The value of the strongest coefficient equals 1.

Instead of reporting all coefficients, a subset comprising $K_0$ coefficients is reported. The coefficients not reported equals zero.

The amplitude and phase for each of the reported $K_0$ coefficients are reported.

At least one of the following alternatives is used to quantize coefficients.

In one alternative Alt 2C-1: all components are jointly reported (across all segments). In particular, A single strongest coefficient is reported out of all of 2LM coefficients comprising P segments.

The size-$K_0$ subset is reported out of all of 2LM coefficients comprising P segments.

The amplitude and phase for each of the reported $K_0$ coefficients are reported.

In one alternative Alt 2C-2: all components are independently reported for each segment. In particular, for each segment p, A single strongest coefficient is reported out of all of $2LM_p$ coefficients.

The size-$K_{0,p}$ subset is reported out of all of $2LM_p$ coefficients.

The amplitude and phase for each of the reported $K_{0,p}$ coefficients are reported.

In one alternative Alt 2C-3: Some components are jointly reported and the remaining are independently reported. For example, The strongest coefficient is reported jointly for all segments.

The size-$K_0$ subset is reported independently for each segment.

The set of values $\{K_{0,p}\}$ is according to one of the following.

In one alternative Alt 2C-4: $K_{0,p}=K_0/P$ for all p assuming P divides K0. If P does not divide $K_0$, then $K_{0,p}=\lceil K_0/P \rceil$ for all $p \in \{0, 1, \ldots, P-2\}$ and $K_{0,p}=K_0-(P-1)\lceil K_0/P \rceil$ for $p=P-1$ In one alternative Alt 2C-5: $\{K_{0,p}\}$ is configured.

In one alternative Alt 2C-6: $\{K_{0,p}\}$ is reported by the UE, but their sum $K_0=\Sigma K_{0,p}$ is configured.

When two-part UCI is used to report CSI, and number of non-zero coefficient ($K_1$) is reported in UCI part 1, then a single joint $K_1$ is reported if Alt 2C-1 is used, and $K_{1,p}$, for each segment p, indicating number of non-zero coefficients in segment p is reported if Alt 2C-2 is used.

In one embodiment 3A, the number of SD compression units, or, the number of ports (i.e., length $2N_1N_2$ of SD basis vectors $a_i$ in Eq. 2) is divided (segmented or grouped) into multiple segments, and the proposed framework for compression in SD and FD is extended for this segmentation (grouping) of ports in SD. It is straightforward for the skilled in the art to extend the embodiment 2A/2B/2C in this case.

In one example Ex 3A-1, the number of segments in SD is 2, one each for the two antenna polarizations. In Ex 3A-2, the number of segments in SD is 4, two each for the two antenna polarizations.

In one embodiment 4A, both the number of SD compression units, or, the number of ports (i.e., length $2N_1N_2$ of SD basis vectors $a_i$ in Eq. 2) and the number of FD compression units, or, the number of SBs for PMI reporting (i.e., length $N_3$ of FD basis vectors $b_m$ in Eq. 2) are divided (segmented or grouped) into multiple segments, and the proposed framework for compression in SD and FD is extended for this segmentation (grouping) of ports in SD. It is straightforward for those skilled in the art to extend the embodiment 2A/2B/2C/3A in this case.

As described above, on a high level, a precoder $W^l$ can be described as follows.

$$W = A C_l B^H = W_1 \tilde{W}_2 W_f^H,$$

where $A=W_1$ corresponds to the $W_1$ in Type II CSI codebook, and $B=W_f$. The $C=\tilde{W}_2$ matrix includes all the required linear combination coefficients (e.g. amplitude and phase or real or imaginary).

Each reported coefficient ($c_{l,i,m} = p_{l,i,m} \phi_{l,i,m}$) in $\tilde{W}_2$ is quantized as amplitude coefficient ($p_{l,i,m}$) and phase coefficient ($\phi_{l,i,m}$). In one example, the amplitude coefficient ($p_{l,i,m}$) is reported using an A-bit amplitude codebook where A belongs to $\{2, 3, 4\}$. If multiple values for A are supported, then one value is configured via higher layer signaling. In another example, the amplitude coefficient ($p_{l,i,m}$) is reported as $p_{l,i,m} = p_{l,i,m}^{(1)} p_{l,i,m}^{(2)}$ where
- $p_{l,i,m}^{(1)}$ is a reference or first amplitude which is reported using a A1-bit amplitude codebook where A1 belongs to $\{2, 3, 4\}$, and
- $p_{l,i,m}^{(2)}$ is a differential or second amplitude which is reported using a A2-bit amplitude codebook where A2≤A1 belongs to $\{2, 3, 4\}$.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $m \in \{0, 1, \ldots, M-1\}$ as $c_{l,i,m}$, and the strongest coefficient as $c_{l,i^*,m^*}$. The strongest coefficient is reported out of the $K_{NZ}$ non-zero (NZ) coefficients that is reported using a bitmap, where $K_{NZ} \le K_0 = \lceil \beta \times 2LM \rceil < 2LM$ and $\beta$ is higher layer configured. The remaining $2LM-K_{NZ}$ coefficients that are not reported by the UE are assumed to be zero. At least one of the following quantization schemes is used to quantize/report the $K_{NZ}$ NZ coefficients.

Scheme 0: UE reports the following for the quantization of the NZ coefficients in $\tilde{W}_2$
- A $\lceil \log_2 K_{NZ} \rceil$-bit indicator for the strongest coefficient index (i*,m*)
  - Strongest coefficient $c_{l,i^*,m^*}=1$ (hence its amplitude/phase are not reported)
- For $\{c_{l,i,m}, (i, m) \ne (i^*,m^*)\}$, quantized to 3-bit amplitude, and either 8PSK (3-bit) or 16PSK (4-bit) phase (which is configurable).
  - For the 3-bit amplitude, a 3-bit amplitude alphabet is used.

Scheme 1: UE reports the following for the quantization of the NZ coefficients in $\tilde{W}_2$
- A $\lceil \log_2 K_{NZ} \rceil$-bit indicator for the strongest coefficient index (i*,m*)
  - Strongest coefficient $c_{l,i^*,m^*}=1$ (hence its amplitude/phase are not reported)
- Two antenna polarization-specific reference amplitudes:
  - For the polarization associated with the strongest coefficient $c_{l,i^*,m^*}=1$, since the reference amplitude $p_{l,i,m}^{(1)}=1$, it is not reported
  - For the other polarization, reference amplitude $p_{l,i,m}^{(1)}$ is quantized to 4 bits
    The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0 \right\}.$$

For $\{c_{l,i,m}, (i, m) \neq (i^*, m^*)\}$:
For each polarization, differential amplitudes $p_{l,i,m}^{(2)}$ of the coefficients calculated relative to the associated polarization-specific reference amplitude and quantized to 3 bits
The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,m}$ is given by $p_{l,i,m}^{(1)} \times p_{l,i,m}^{(2)}$
Each phase is quantized to either 8PSK (3-bit) or 16PSK (4-bit) (which is configurable).

Scheme 2: UE reports the following for the quantization of the NZ coefficients in $\tilde{W}_2$ A $\lceil \log_2 K_{NZ} \rceil$-bit indicator for the strongest coefficient index $(i^*, m^*)$
Strongest coefficient $c_{l,i^*,m^*} = 1$ (hence its amplitude/phase are not reported)
For $\{c_{l,i,m^*}, i \neq i^*\}$: quantized to 4-bit amplitude, and 16PSK phase
The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}.$$

For $\{c_{l,i,m}, m \neq m^*\}$: quantized to 3-bit amplitude, and either 8PSK or 16PSK phase (which is configurable)
The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

In the rest of the disclosure, the details about the high rank (rank >1) extension of the above-mentioned quantization schemes are proposed, where rank corresponds to a number of layers $v$ (or RI value) that the reported CSI corresponds to. In this disclosure, $v$ layers are indexed as $l=0, 1, 2, \ldots, v-1$.

In the rest the disclosure, it is assumed that $K_{NZ}$ is reported via part 1 of a two-part UCI comprising UCI part 1 and UCI part 2.

In one embodiment 0, the strongest coefficient $c_{l,i^*,m^*}$ for rank >1, e.g. RI∈{2,3,4}, is determined/reported using a strongest coefficient indicator (SCI) according to at least one of the following alternatives (Alt). If multiple alternatives are supported, then at least one of the supported alternatives is either configured (e.g. via higher layer RRC signaling) or reported by the UE.

In one alternative Alt 0-0: A single strongest coefficient $c_{l,i^*,m^*}$ is determined/reported across all layers (i.e., regardless of the $v$ or RI value) where $l^*$ is the index of the layer to which the strongest coefficient belongs to. For layer $l=l^*$, the index of the strongest coefficient $c_{l^*,i^*,m^*}=1$ is reported (hence its amplitude and phase are not reported), and for layers $l \neq l^*$, the strongest coefficient $c_{l,i^*,m^*}$ is not reported (hence, amplitude and phase are reported for all NZ coefficients for those layers). The number of bits to report the strongest coefficient is $\lceil \log_2 v \rceil + \lceil \log_2 K_{NZ,l^*} \rceil$ where $\lceil \log_2 v \rceil$ bits are used to indicate the layer index $l^*$, and $\lceil \log_2 K_{NZ,l^*} \rceil$ bits are used to indicate the index of the strongest coefficient $c_{l^*,i^*,m^*}$, and $K_{NZ,l^*}$ is the number of NZ coefficients reported for layer $l^*$. In one alternative, $K_{NZ,l^*} = aK_0$ where $K_0 = \lceil \beta \times 2LM \rceil < 2LM$ and $\beta$ is higher layer configured, and a is a fixed integer (e.g. a=1 or 2).

In one alternative Alt 0-1: A single strongest coefficient $c_{l,i^*,m^*}$ is determined/reported across all layers (i.e., regardless of the $v$ or RI value). The strongest coefficient $c_{l,i^*,m^*}$ is common for all layers, i.e., index $(i^*, m^*)$ of the strongest coefficient is the same for all layers, which implies that $c_{l,i^*,m^*}=1$ for all $l=0, 1, \ldots, v-1$. The number of bits to report the strongest coefficient is $\lceil \log_2 K_{NZ,union} \rceil$ where $K_{NZ,union}$ is the number of NZ coefficients across of all layers (i.e., it corresponds to a union of NZ coefficients across all layers). In one alternative, $K_{NZ,union} = aK_0$ where $K_0 = \lceil \beta \times 2LM \rceil < 2LM$ and $\beta$ is higher layer configured, and a is a fixed integer (e.g. a=1 or 2).

In one alternative Alt 0-2: A single strongest coefficient $c_{l,i^*,m^*}$ is determined/reported across all layers comprising a layer-group, where $l^*$ is the index of the layer (within the layer-group) to which the strongest coefficient belongs to. For layer $l=l^*$ within the layer-group, the index of the strongest coefficient $c_{l^*,i^*,m^*}=1$ is reported (hence its amplitude and phase are not reported), and for layers $l \neq l^*$ within the layer-group, the strongest coefficient $c_{l,i^*,m^*}$ is not reported (hence, amplitude and phase are reported for all NZ coefficients for those layers). The number of bits to report the strongest coefficient is $\lceil \log_2 v_g \rceil + \lceil \log_2 K_{NZ,l^*} \rceil$ where $\lceil \log_2 v_g \rceil$ bits are used to indicate the layer index $l^*$ within the layer-group g, $v_g$ is the number of layers in the layer-group g, and $\lceil \log_2 K_{NZ,l^*,g} \rceil$ bits are used to indicate the index of the strongest coefficient $c_{l^*,i^*,m^*}$, and $K_{NZ,l^*,g}$ is the number of NZ coefficients for layer $l^*$ within the layer-group g. In one example, a layer group corresponds to non-overlapping and consecutive layer pairs. For example, layer pair (0,1) comprises one layer-group and layer pair (2,3) comprises another layer-group. In one alternative, $K_{NZ,l^*} = aK_0$ where $K_0 = \lceil \beta \times 2LM \rceil < 2LM$ and $\beta$ is higher layer configured, and a is a fixed integer (e.g. a=1 or 2).

In one alternative Alt 0-3: A single strongest coefficient $c_{l,i^*,m^*}$ is determined/reported across all layers comprising a layer-group. The strongest coefficient $c_{l,i^*,m^*}$ is common for all layers comprising a layer-group, i.e., index $(i^*, m^*)$ of the strongest coefficient is the same for all layers, which implies that $c_{l,i^*,m^*}=1$ for all l values comprising a layer-group. In one example, a layer group corresponds to non-overlapping and consecutive layer pairs. For example, layer pair (0,1) comprises one layer-group and layer pair (2,3) comprises another layer-group. The number of bits to report the strongest coefficient is $\lceil \log_2 K_{NZ,union,g} \rceil$ where $K_{NZ,union,g}$ is the number of NZ coefficients across of all layers comprising layer-group g (i.e., it corresponds to a union of NZ coefficients across all layers comprising layer-group g). In one alternative, $K_{NZ,union,g} = aK_0$ where $K_0 = \lceil \beta \times 2LM \rceil < 2LM$ and $\beta$ is higher layer configured, and a is a fixed integer (e.g. a=1 or 2).

In one alternative Alt 0-4: A strongest coefficient $c_{l^*,i^*,m^*}$ is determined/reported independently for each layer $l=0, 1, \ldots, v-1$ (regardless of the $v$ or RI value). For each layer l, the index of the strongest coefficient $c_{l,i^*,m^*}=1$ is reported (hence its amplitude and phase are not reported). The $v$ strongest coefficient indicators (SCIs) are reported separately. Let $K_{NZ,l}$ be the number of NZ coefficients for layer l. Then, $\lceil \log_2 K_{NZ,l} \rceil$ bits are used to indicate the SCI for layer l. So, the total payload of reporting SCIs for all $v$ layers is $\sum_{l=0}^{v-1} \lceil \log_2 K_{NZ,l} \rceil$ bits. In one alternative, $K_{NZ,l} = aK_0$ where $K_0 = \lceil \beta \times 2LM \rceil < 2LM$ and $\beta$ is higher layer configured, and a is a fixed integer (e.g. a=1 or 2).

In one alternative Alt 0-5: A strongest coefficient $c_{l,i^*,m^*}$ is determined/reported independently for each layer $l=0, 1, \ldots, v-1$ (regardless of the $v$ or RI value). For each layer $l$, the index of the strongest coefficient $c_{l,i^*,m^*}=1$ is reported (hence its amplitude and phase are not reported). The $v$ strongest coefficient indicators (SCIs) are reported jointly. Let $K_{NZ,union}$ be the number of NZ coefficients across of all layers (i.e., it corresponds to a union of NZ coefficients across all layers). So, the total payload of reporting SCIs for all $v$ layers is either $$\left\lceil \log_2 \binom{K_{NZ,union}}{v} \right\rceil$$

bits assuming SCIs for any two-layers are different, or $$\left\lceil \log_2 \binom{K_{NZ,union}+v-1}{v} \right\rceil = \left\lceil \log_2 \binom{K_{NZ,union}+v-1}{K_{NZ,union}-1} \right\rceil$$

bits assuming SCIs for two layers can be the same. In one alternative, $K_{NZ,union}=aK_0$ where $K_0=\lceil \beta \times 2LM \rceil < 2LM$ and $\beta$ is higher layer configured, and a is a fixed integer (e.g. a=1 or 2).

In one alternative Alt 0-6: For RI=1, strongest coefficient indicator (SCI) is a $\lceil \log_2 K_{NZ} \rceil$-bit indicator. For RI>1, SCI is determined/reported independently for each layer $l=0, 1, \ldots, v-1$ (regardless of the $v$ or RI value). For each layer $l$, the index of the strongest coefficient $c_{l,i^*,m^*}=1$ is reported (hence its amplitude and phase are not reported). The $v$ strongest coefficient indicators (SCIs) are reported separately (independently per layer). Let $K_{NZ,tot}$ be the total number of NZ coefficients across of all layers. So, the payload of reporting SCI for each layer is $\lceil \log_2 K_{NZ,tot} \rceil$ bits. In one alternative, $K_{NZ,tot}=aK_0$ where $K_0=\lceil \beta \times 2LM \rceil < 2LM$ and $\beta$ is higher layer configured, and a is a fixed integer (e.g. a=1 or 2).

In one alternative Alt 0-7: For RI=1, strongest coefficient indicator (SCI) is a $\lceil \log_2 K_{NZ} \rceil$-bit indicator. For RI>1, SCI is determined/reported independently for each layer $l=0, 1, \ldots, v-1$ (regardless of the $v$ or RI value). For each layer $l$, the index of the strongest coefficient $c_{l,i^*,m^*}=1$ is reported (hence its amplitude and phase are not reported). The $v$ strongest coefficient indicators (SCIs) are reported separately (independently per layer). Let $K_{NZ,tot}=\Sigma_{l=0}^{RI-1} K_{NZ,l}$ be the total number of NZ coefficients across of all layers. So, the payload of reporting SCI for each layer is $\lceil \log_2 \min(K_{NZ,tot}, 2L_l M_l) \rceil = \lceil \log_2 \min(\Sigma_{l=0}^{RI-1} K_{NZ,l}, 2L_l M_l) \rceil$ bits, where $2L_l M_l$ is the size (number of bits) of the bitmap indicating the locations (indices) of NZ coefficients for layer $l$. In one example, $L_l=L$ for all $l$.

In one alternative Alt 0-8: For RI=1, strongest coefficient indicator (SCI) is a $\lceil \log_2 K_{NZ} \rceil$-bit indicator. For RI>1, SCI is determined/reported independently for each layer $l=0, 1, \ldots, v-1$ (regardless of the $v$ or RI value). For each layer $l$, the index of the strongest coefficient $c_{l,i^*,m^*}=1$ is reported (hence its amplitude and phase are not reported). The $v$ strongest coefficient indicators (SCIs) are reported separately (independently per layer). The payload of reporting SCI for each layer is $\lceil \log_2 2L_l \rceil$ bits, which indicates the SD beam index $i^*$ of the strongest coefficient. The FD beam index $m^*$ is fixed, e.g., $m^*=1$. In one example, $L_l=L$ for all $l$.

Let $K_{NZ,l}$ be the number of NZ coefficients reported by the UE for layer $l \in \{0, 1, \ldots, v-1\}$, and let $K_{NZ,tot}=\Sigma_{l=0}^{v-1} K_{NZ,l}$ be the total number of NZ coefficients across $v$ layers.

In one embodiment 0A, a UE is configured to report the number of NZ coefficients for each layer independently (e.g. via UCI part 1). For each $l \in \{0, 1, \ldots, v-1\}$, the UE reports $K_{NZ,l}$ using $\lceil \log_2 K_0 \rceil$ bits indication where $K_0$ is the maximum number of NZ coefficients that the UE can report for each layer, so the total payload (number of bits) for this reporting is $v \times \lceil \log_2 K_0 \rceil$. Alternatively, for each $l \in \{0, 1, \ldots, v-1\}$, the UE reports $K_{NZ,l}$ using $\lceil \log_2 K_{0,l} \rceil$ bits indication where $K_{0,l}$ is the maximum number of NZ coefficients that the UE can report for layer $l$, so the total payload (number of bits) for this reporting is $\Sigma_{l=0}^{v-1} \lceil \log_2 K_{0,l} \rceil$. The value $K_0=\lceil \beta \times 2LM \rceil < 2LM$ and $\beta$ is higher layer configured. Likewise, the value $K_{0,l}=\lceil \beta_l \times 2LM \rceil < 2LM$ and $\beta_l$ is higher layer configured for each $l$. In one example, $\beta_0=\beta_1$, $\beta_2=\beta_3$ and $\beta_0 \neq \beta_2$, and both $\beta_0$ and $\beta_2$ are higher layer configured. In another example, $\beta_0$ is higher layer configured, and $\beta_1$, $\beta_2$ and $\beta_3$ are determined based on the configured $\beta_0$ value. In one example, the bitmap for each layer is reported via UCI part 1 of a two-part UCI.

For layer $l$, the UE is further configured to report a size 2LM bitmap $B_l$ comprising $K_{NZ,l}$ ones "1" indicating the location of NZ coefficients. Alternatively, for layer $l$, the UE is further configured to report a size 2LM bitmap $B_l$ comprising $K_{NZ,l}$ zeros "0" indicating the location of NZ coefficients. In one example, the bitmap for each layer is reported via UCI part 2 of a two-part UCI. So, the total payload (number of bits) for this reporting is $v \times 2LM$. Here, it is assumed that $(L, M)$ is common for all layers. Alternatively, if $(L, M)=(L_l, M_l)$ for layer $l$, then the total payload (number of bits) for this reporting is $\Sigma_{l=0}^{v-1} 2L_l M_l$.

Furthermore, the UE is further configured to report a strongest coefficient indicator (SCI) Il using $\lceil \log_2 K_{NZ,l} \rceil$ bits that indicates the location (index) of the strongest coefficient. In one example, the SCI for each layer is reported via UCI part 2 of a two-part UCI. So, the total payload (number of bits) for this reporting is $\Sigma_{l=0}^{v-1} \lceil \log_2 K_{NZ,l} \rceil$.

Finally, the UE is further configured to report amplitude and phase of all NZ coefficients except the strongest coefficients. Assuming Scheme 1 for amplitude and phase reporting, for each layer $l$, the UE reports a reference amplitude using 4 bits, $(K_{NZ,l}-1)$ differential amplitude using 3 bits for each, and $(K_{NZ,l}-1)$ phase values using P ∈ {3, 4} bits for each. So, for layer $l$, the total payload (number of bits) for reporting is $4+3(K_{NZ,l}-1)+P(K_{NZ,l}-1)=3K_{NZ,l}+1+P(K_{NZ,l}-1)$. And the total payload across all layers is $3K_{NZ,tot}+v+P(K_{NZ,tot}-v)$.

In one variation of embodiment 0A, when the UE is configured with max RI>1, then RI is reported according to at least one of the following alternatives.

In one alternative Alt 0A-0: RI is reported as a separate UCI parameter (e.g. UCI part 1).

In one alternative Alt 0A-1: RI is not reported explicitly as a separate UCI parameter, and RI is derived from the number of NZ coefficients ($K_{NZ,l}$) reported independently for each layer $l$. Let $RI_{max}$ be the maximum RI value configured to the UE. At least for one of the sub-alternatives is used.

In one alternative Alt 0A-1-0: for each layer $l \in \{0, 1, \ldots, RI_{max}-1\}$, the UE reports $K_{NZ,l} \in \{0, 1, 2, \ldots, K_0\}$ using $\lceil \log_2 (K_0+1) \rceil$ bits indication.

In one alternative Alt 0A-1-1: for layer $l=0$, the UE reports $K_{NZ,l} \in \{1, 2, \ldots, K_0\}$ using $\lceil \log_2 K_0 \rceil$ bits indication, and for each layer $l \in \{1, \ldots, RI_{max}-1\}$, the UE reports $K_{NZ,l} \in \{0, 1, 2, \ldots, K_0\}$ using $\lceil \log_2 (K_0+1) \rceil$ bits indication.

In one alternative Alt 0A-1-2: for layer l=0, the UE reports $K_{NZ,l} \in \{1, 2, \ldots, K_0\}$ using $\lceil \log_2 K_0 \rceil$ bits indication, and for each layer $l \in \{1, \ldots, RI_{max}-1\}$, the UE reports $K_{NZ,l} \in \{0, 1, 2, \ldots, K_0-1\}$ using $\lceil \log_2 K_0 \rceil$ bits indication.

In another variation of embodiment 0A, the bitmap to report the indices of NZ coefficients (e.g. via UCI part 2) is determined/reported as follows. When $RI \in \{1, 2\}$, then for each layer $l \in \{0, \ldots, RI-1\}$, a bitmap $B_l$ comprising 2LM bits is reported by the UE. When $RI \in \{3, 4\}$, then the bitmap is determined/reported according to at least one of the following alternatives.

In one alternative Alt 0A-2: for each layer $l \in \{0, \ldots, RI-1\}$, a bitmap $B_l$ comprising $2LM_l$ bits is reported by the UE, where $M_l$ is a number of FD basis vectors (beams) for layer l.

In one alternative Alt 0A-3: a X-bit bitmap is reported via UCI part 1 to indicate layers whose coefficients corresponding to the "weak" antenna polarization (at the gNB) are dropped (i.e., coefficients are set zero), and for each layer $l \in \{0, \ldots, RI-1\}$, a bitmap $B_l$ comprising $y \times LM_l$ bits is reported by the UE, where y=1 if the weak polarization coefficients are dropped, and y=2 otherwise (if the weak polarization coefficients are not dropped).

In one embodiment 0B, a UE is configured to report a single SCI (instead of v SCIs in embodiment 0A) in UCI part 2 using $\lceil \log_2 K_{NZ,l^*} \rceil$ bits that indicates the location (index) of the strongest coefficient for layer $l^*$. The UE is further configured to report a layer indicator J (e.g. using $\lceil \log_2 v \rceil$ bits) to indicate the layer index $l^*$ to which the strongest coefficient belongs to. This indication is in UCI part 1. The UE reports the number of NZ coefficients for each layer independently, and bitmaps $B_l$ indicating the location of NZ coefficients for each layer l, details of which are the same as in embodiment 0A.

Finally, the UE is further configured to report amplitude and phase of all NZ coefficients expect the strongest coefficients. Assuming Scheme 1 for amplitude and phase reporting, for layer $l=l^*$, the UE reports a reference amplitude using 4 bits, $(K_{NZ,l}-1)$ differential amplitude using 3 bits for each, and $(K_{NZ,l}-1)$ phase values using P 531 $\{3, 4\}$ bits for each. So, for layer $l=l^*$, the total payload (number of bits) for reporting is $4+3(K_{NZ,l}-1)+P(K_{NZ,l}-1)=3K_{NZ,l}+1+P(K_{NZ,l}-1)$. for layer $l \neq l^*$, the UE reports a reference amplitude using 4 bits, $K_{NZ,l}$ differential amplitude using 3 bits for each, and $K_{NZ,l}$ phase values using $P \in \{3, 4\}$ bits for each. So, for layer $l \neq l^*$, the total payload (number of bits) for reporting is $4+3K_{NZ,l}+PK_{NZ,l}$.

In one embodiment 0C, a UE is configured to report the total (sum) number of NZ coefficients ($K_{NZ,tot}$) across all layers (e.g. via UCI part 1). The UE reports $K_{NZ,tot}$ using $\lceil \log_2 aK_0 \rceil$ bits indication where $K_0$ is the maximum number of NZ coefficients that the UE can report for each layer, and a is a fixed integer depending on the max RI value that the UE can report (e.g. based on the RI restriction via higher layer signaling). For example, When max RI=1, then a=1.
When max RI>1, then a=2.

In another example, the UE reports $K_{NZ,tot}$ using $\lceil \log_2 \Sigma_{l=0}^{v-1} K_{0,l} \rceil$ bits indication where $K_{0,l}$ is the maximum number of NZ coefficients that the UE can report for layer l. The value $K_0 = \lceil \beta \times 2LM \rceil < 2LM$ and $\beta$ is higher layer configured. Likewise, the value $K_{0,l} = \lceil \beta_l \times 2LM \rceil < 2LM$ and $\beta_l$ is higher layer configured for each l. In one example, $\beta_0 = \beta_1$, $\beta_2 = \beta_3$ and $\beta_0 \neq \beta_2$, and both $\beta_0$ and $\beta_2$ are higher layer configured. In another example, $\beta_0$ is higher layer configured, and $\beta_1$, $\beta_2$ and $\beta_3$ are determined based on the configured $\beta_0$ value. In one example, the bitmap for each layer is reported via UCI part 1 of a two-part UCI.

The UE is further configured to report a single 2LMxv bitmap B comprising $K_{NZ,tot}$ ones "1" indicating the location of NZ coefficients. Alternatively, the UE is further configured to report a single 2LMxv bitmap B comprising $K_{NZ,l}$ zeros "0" indicating the location of NZ coefficients. In one example, the bitmap B is reported via UCI part 2 of a two-part UCI. So, the total payload (number of bits) for this reporting is v×2LM. Here, it is assumed that (L, M) is common for all layers. Alternatively, if $(L, M)=(L_l, M_l)$ for layer l, then size of the bitmap is $\Sigma_{l=0}^{v-1} 2L_l M_l$, and hence the total payload (number of bits) for this reporting is $\Sigma_{l=0}^{v-1} 2L_l M_l$. In one example, the bitmap B is concatenated across layers, i.e., $B=B_0, \ldots B_{v-1}$ where $B_l$ is a bitmap for layer l, and $B_l = B_{l,0} B_{l,1} \ldots B_{l, M_l-1}$ is concatenated across columns (FD index), or $B_l = B_{l,0} B_{l,1} \ldots B_{l, L_l-1}$ is concatenated across rows (SD index). In another example, the bitmap B is concatenated first across rows (SD index) then across columns (FD index) then across layers. In another example, the bitmap B is concatenated first across columns (FD index) then across rows (SD index) then across layers. A few other examples of bitmap are as follows where the notation "A→B" indicates A precedes B in ordering.

Layer→rows→columns
Layer→columns→rows
Columns→layers→rows
Columns→rows→layers
Rows→layers→columns
Rows→columns→layers.

Furthermore, the UE is further configured to report a single strongest coefficient indicator (SCI) across all layers using $\lceil \log_2 K_{NZ,tot} \rceil$ bits that indicates the location (index) of the strongest coefficient across all layers. In one example, the SCI is reported via UCI part 2 of a two-part UCI.

Finally, the UE is further configured to report amplitude and phase of all NZ coefficients expect the strongest coefficients. Assuming Scheme 1 for amplitude and phase reporting, the UE reports a reference amplitude using 4 bits, $(K_{NZ,tot}-1)$ differential amplitude using 3 bits for each, and $(K_{NZ,tot}-1)$ phase values using P 531 $\{3, 4\}$ bits for each. So, the total payload (number of bits) for reporting is $4+3(K_{NZ,tot}-1)+P(K_{NZ,tot}-1)=3K_{NZ,tot}+1+P(K_{NZ,tot}-1)$.

In one variation of embodiment 0C, when the UE is configured with max RI>1, then $K_{NZ,tot}$ is reported according to at least one of the following alternatives.

In one alternative Alt 0C-0: When UE reports RI=1, then the UE reports $K_{NZ,tot} \in \{0, 1, 2, \ldots, K_0\}$ using $\lceil \log_2 (K_0+1) \rceil$ bits indication, and when UE reports RI>1, then the UE reports $K_{NZ,tot} \in \{0, 1, 2, \ldots, 2K_0\}$ using $\lceil \log_2 (2K_0+1) \rceil$ bits indication, where $K_{NZ,tot}=0$ indicates SD/FD basis insufficiency.

In one alternative Alt 0C-1: When UE reports RI=1, then the UE reports $K_{NZ,tot} \in \{1, 2, \ldots, K_0\}$ using $\lceil \log_2(K_0) \rceil$ bits indication, and when UE reports RI>1, then UE reports $K_{NZ,tot} \in \{1, 2, \ldots, 2K_0\}$ using $\lceil \log_2 (2K_0) \rceil$ or $1+\lceil \log_2 (K_0) \rceil$ bits indication. Alternatively, when UE reports RI>1, then UE reports $K_{NZ,tot} \in \{RI, RI+1, \ldots, 2K_0\}$ using $\lceil \log_2 (2K_0-RI+1) \rceil$ bits indication.

In another variation of embodiment 0C, when the UE is configured with max RI>1, then $K_{NZ,tot}$ is reported in a differential manner such that $K_{NZ,tot}$ comprises RI components $K_{NZ, 0}, K_{NZ, 1}, \ldots K_{NZ, RI-1}$, where $K_{NZ, 0}$ is a reference component and indicates a number of NZ coefficients for layer 0.

For each layer $l \in \{1, \ldots, RI-1\}$, $K_{NZ,l}$ is a differential component and indicates a differential number of NZ coefficients for layer l. In one example, the actual number of NZ coefficients for layer 1 is $K_{NZ,0}+K_{NZ,l}$.

In one example, $K_{NZ,l}=\alpha \times 2K_0$, where a<1 is a fraction, and is either fixed, or configured or reported by the UE. In another example, $K_{NZ,l} \in \{0, 1, \ldots, x-1\}$, where x is either fixed, or configured, or reported by the UE.

In another variation of embodiment 0C, when the UE is configured with max RI>1, then $K_{NZ,tot}$ is reported in a differential manner such that $K_{NZ,tot}$ comprises a reference component $K_{NZ,\ ref}$ and RI differential components $K_{NZ,\ 0}$, $K_{NZ,\ 1}, \ldots, K_{NZ,\ RI-1}$, where $K_{NZ,\ 0}$ indicates a total number of NZ coefficients for all layers. Alternatively, $K_{NZ,\ 0}$ indicates a number of NZ coefficients that are a union of NZ coefficients for all layers.

For each layer $l \in \{0, 1, \ldots, RI-1\}$, $K_{NZ,l}$ indicates a differential number of NZ coefficients for layer l. In one example, the actual number of NZ coefficients for layer l is $K_{NZ,\ 0}-K_{NZ,l}$.

In one example, $K_{NZ,l}=\alpha \times 2K_0$, where a<1 is a fraction, and is either fixed, or configured or reported by the UE. In another example, $K_{NZ,l} \in \{0, 1, \ldots, x-1\}$, where x is either fixed, or configured, or reported by the UE. In one example, $K_{NZ,\ 0} \in \{1, \ldots, 2K_0\}$.

In one embodiment 0D, a UE is configured to report the total (sum) number of NZ coefficients ($K_{NZ,tot}$) across all layers (e.g., via UCI part 1) as explained in embodiment 0C. For each layer l, the UE is further configured to report the following (e.g. via UCI part 2):

Number of NZ coefficients $K_{NZ,l}$ (e.g. via UCI part 2) so that their sum $\Sigma_{l=0}^{v-1} K_{NZ,\ 1}=K_{NZ,tot}$, Bitmap $B_l$ as in embodiment 0A, SCI where the payload (bits) for SCI reporting is fixed regardless of the reported $K_{NZ,l}$ value, and Amplitude and phase as in embodiment 0A.

In a variation, the number of NZ coefficients $K_{NZ,l}$ is not reported by the UE.

In one embodiment 0E, a UE is configured to report CSI in layer-groups where layer-groups are according to some embodiments in this disclosure (e.g. embodiment X). For a layer-group g, the UE is configured to CSI components such as number of NZ coefficients, bitmap, strongest coefficient indicator and amplitude/phase according to at least one of embodiment 0/0A/0B/0C/0D. For any two layer-groups, the UE reports these components independently, i.e., the UE reports these components for each layer-group.

In one embodiment 0F, when RI>1, a UE is configured to report either the total (sum) number of NZ coefficients ($K_{NZ,tot}=\Sigma_{l=0}^{RI-1} K_{NZ,l}$) across all layers or per layer number of NZ coefficients ($K_{NZ,l}$) (e.g., via UCI part 1) as explained in some of the embodiments of this disclosure, where per layer $K_{NZ,l}$ is according to at least one of the following alternatives.

In one alternative Alt 0F-0: $K_{NZ,l}$ is unrestricted such that $\Sigma_{l=0}^{RI-1} K_{NZ,l} \leq 2K_0$ In one alternative Alt 0F-1: $K_{NZ,l}$ is restricted such that $K_{NZ,l} \leq K_0$ and $\Sigma_{l=0}^{RI-1} K_{NZ,\ l} \leq 2K_0$ In one embodiment 1, when rank >1, e.g., RI∈{2,3,4}, the reference amplitude $p_{l,i,m}^{(1)}$ for the other antenna polarization (for the polarization not associated with the strongest coefficient as explained in Scheme 1) is determined/reported according to at least one of the following alternatives (Alt). If multiple alternatives are supported, then at least one of the supported alternatives is either configured (e.g. via higher layer RRC signaling) or reported by the UE.

In one alternative Alt 1-0: A single reference amplitude $p_{l^*,i,m}^{(1)}$ is determined/reported across all layers (i.e., regardless of the v or RI value) where l* is the index of the layer to which the reference amplitude belongs to. For layer l=l*, the reference amplitude $p_{l^*,i,m}^{(1)}$ is reported, and for layers l≠l*, the reference amplitude $p_{l,i,m}^{(1)}$ is not reported and it is assumed to be a fixed value (e.g., $p_{l,i,m}^{(1)}=1$). The number of bits to report the reference amplitude is A, where A=4 in one example.

In one alternative Alt 1-1: A single reference amplitude $p_{l,i,m}^{(1)}$ is determined/reported across all layers (i.e., regardless of the v or RI value). The single reference amplitude $p_{l,i,m}^{(1)}$ is common for all layers, i.e., it is the same for all layers. The number of bits to report the reference amplitude is A, where A=4 in one example.

In one alternative Alt 1-2: A reference amplitude $p_{l^*,i,m}^{(1)}$ is determined/reported across all layers comprising a layer-group, where l* is the index of the layer (within the layer-group) to which the reference amplitude belongs to. For layer l=l* within the layer-group, the reference amplitude $p_{l^*,i,m}^{(1)}$ is reported, and for layers l≠l* within the layer-group, the reference amplitude) $p_{l,i,m}^{(1)}$ is on not reported and it is assumed to be a fixed value (e.g., $p_{l,i,m}^{(1)}=1$). The number of bits to report the reference amplitude is A×G, where G=number of layer-groups, and A=4 in one example. In one example, a layer group corresponds to non-overlapping and consecutive layer pairs. For example, layer pair (0,1) comprises one layer-group and layer pair (2,3) comprises another layer-group.

In one alternative Alt 1-3: A single reference amplitude $p_{l,i,m}^{(1)}$ is determined/reported across all layers comprising a layer-group. The single reference amplitude $p_{l,i,m}^{(1)}$ is common for all layers comprising a layer-group, i.e., it is the same for all layers comprising a layer-group. The number of bits to report the reference amplitude is A×G, where G=number of layer-groups, and A=4 in one example. In one example, a layer group corresponds to non-overlapping and consecutive layer pairs. For example, layer pair (0,1) comprises one layer-group and layer pair (2,3) comprises another layer-group.

In one alternative Alt 1-4: A single reference amplitude $p_{l,i,m}^{(1)}$ is determined/reported independently for each layer l=0, 1, . . . , v−1 (regardless of the v or RI value). The number of bits to report the reference amplitude is A×v, where A=4 in one example.

In one embodiment 2, when rank >1, e.g. RI∈{2,3,4}, the FD unit index m* (whose coefficients $\{c_{l,i,m^*}, i \neq i^*\}$ are assigned more bits for amplitude and phase reporting in Scheme 2) is determined according to at least one of the following alternatives (Alt). If multiple alternatives are supported, then at least one of the supported alternatives is either configured (e.g. via higher layer RRC signaling) or reported by the UE.

In one alternative Alt 2-0: the FD unit index m* is determined common for all layers, i.e., it is the same for all layers.

In one alternative Alt 2-1: the FD unit index m* is determined independently for each layer.

In one alternative Alt 2-2: the FD unit index m* is determined independently for each layer-group, and within a layer-group, the FD unit index m* is common for all layers comprising the layer-group. In one example, a layer group corresponds to non-overlapping and consecutive layer pairs. For example, layer pair (0,1) comprises one layer-group and layer pair (2,3) comprises another layer-group.

In one embodiment X, a layer-group in embodiment 0/1/2 of this disclosure corresponds to non-overlapping and consecutive layer pairs. A few examples of layer-groups are as follows depending on the RI value.

In one example Ex X-0: if the UE is configured to report a maximum value for RI=1, when the UE reports RI=1, there is only one layer-group comprising layer 0.

In one example Ex X-1: if the UE is configured to report a maximum value for RI=2, when the UE reports RI=1, there is only one layer-group comprising layer 0, and when the UE reports RI=2, there is only one layer-group comprising layers 0.

In one example Ex X-2: if the UE is configured to report a maximum value for RI=3, then when the UE reports RI=1, there is only one layer-group comprising layer 0, when the UE reports RI=2, there is only one layer-group comprising layers 0 and 1, and when the UE reports RI=3, there are two layer-groups, layer-group 0 comprising layers 0 and 1, and layer-group 1 comprising layer 2.

In one example Ex X-3: if the UE is configured to report a maximum value for RI=4, when the UE reports RI=1, there is only one layer-group comprising layer 0, when the UE reports RI=2, there is only one layer-group comprising layers 0 and 1, when the UE reports RI=3, there are two layer-groups, layer-group 0 comprising layers 0 and 1, and layer-group 1 comprising layer 2, and when the UE reports RI=4, there are two layer-groups, layer-group 0 comprising layers 0 and 1, and layer-group 1 comprising layers 2 and 3.

Figure 14:
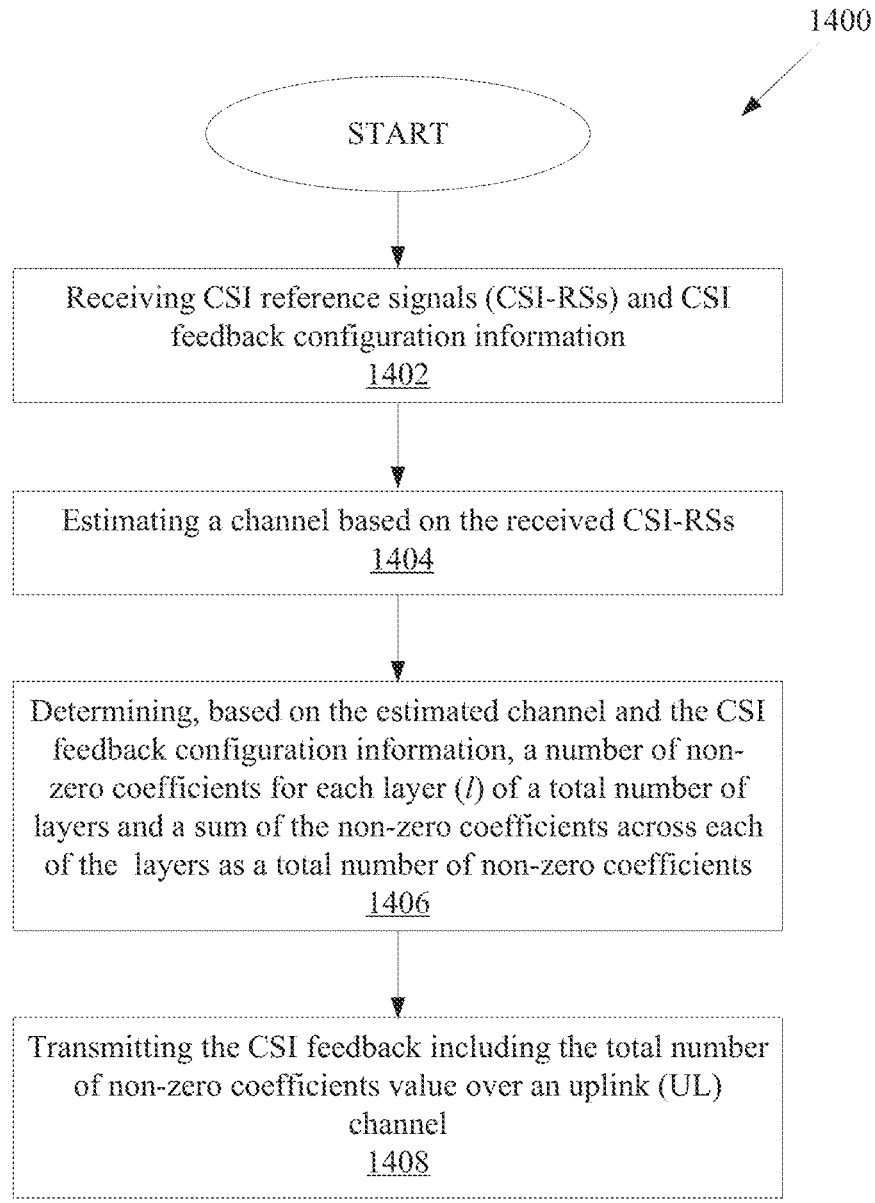
FIG. 14 illustrates a flow chart of a method for transmitting an UL transmission including CSI feedback, as may be performed by a UE according to embodiments of the present disclosure.

FIG. 14 illustrates a flow chart of a method 1400 for operating a user equipment (UE) for channel state information (CSI) feedback in a wireless communication system, as may be performed by a UE, according to embodiments of the present disclosure. The embodiment of the method 1400 illustrated in FIG. 14 is for illustration only. FIG. 14 does not limit the scope of this disclosure to any particular implementation.

As illustrates in FIG. 14, the method 1400 begins at step 1402. In step 1402, the UE (e.g., 111-116 as illustrated in FIG. 1) receives, from a base station (BS), CSI reference signals (CSI-RSs) and CSI feedback configuration information.

In step 1404, the UE estimates a channel based on the received CSI-RSs.

In step 1406, the UE determines, based on the estimated channel and the CSI feedback configuration information, a number of non-zero coefficients ($K_l^{NZ}$) for each layer (l) of a total number of $\upsilon$ layers, where $\upsilon \geq 1$ is a rank value, and a sum of the $K_l^{NZ}$ across each of the $\upsilon$ layers as a total number of non-zero coefficients ($K^{NZ}$), where $K^{NZ} = \sum_{l=1}^{\upsilon} K_l^{NZ}$.

In step 1408, the UE transmits, to the BS, the CSI feedback including the $K^{NZ}$ value over an uplink (UL) channel.

In one embodiment, a maximum number of non-zero coefficients the UE can report per layer is $K_0$ such that $K_l^{NZ} \leq K_0$.

In one embodiment, the CSI feedback configuration information includes a maximum allowed value for $\upsilon$. When the maximum allowed value for $\upsilon$ is greater than 1, a maximum value for the $K^{NZ}$ the UE can report is $2K_0$ such that $K^{NZ} \leq 2K_0$, and a number of bits for the UE to report the $K^{NZ}$ is $\lceil \log_2(2K_0) \rceil$ where $\lceil \, \rceil$ is a ceiling function.

In one embodiment, the CSI feedback configuration information includes a maximum allowed value for $\upsilon$. When the maximum allowed value for $\upsilon$ is equal to 1, a maximum value for the $K^{NZ}$ the UE can report is $K_0$ such that $K^{NZ} \leq K_0$, and a number of bits for the UE to report the $K^{NZ}$ is $\lceil \log_2 (K_0) \rceil$ where $\lceil \, \rceil$ is a ceiling function.

In one embodiment, $K_0 = \lceil \beta \times 2LM \rceil$, where $\lceil \, \rceil$ is a ceiling function, $\beta < 1$ is a higher layer configured parameter, and 2LM is a total number of coefficients for each layer l, where a total of 2LM coefficients form a 2L×M coefficient matrix $C_l$ comprising 2L rows and M columns, the $K_l^{NZ}$ non-zero coefficients correspond to non-zero coefficients of the 2L×M coefficient matrix $C_l$, and the remaining $2LM - K_l^{NZ}$ coefficients of the 2L×M coefficient matrix $C_l$ are zero.

In one embodiment, the CSI feedback includes a precoding matrix indicator (PMI) indicating the 2L×M coefficient matrix $C_l$, a spatial domain (SD) basis matrix $A_l$ and a frequency domain (FD) basis matrix $B_l$ for each $l=1, \ldots, \upsilon$, and where a precoding matrix for each FD unit of a total number ($N_3$) of FD units is determined by columns of $$W = \frac{1}{\sqrt{\upsilon}} [W^1 \, W^2 \, \ldots \, W^\upsilon] \text{ where } W^l =$$

$$\begin{bmatrix} A_l & 0 \\ 0 & A_l \end{bmatrix} C_l B_l^H = \begin{bmatrix} \sum_{k=0}^{M-1} \sum_{i=0}^{L-1} c_{l,i,k}(a_{l,i} b_{l,k}^H) \\ \sum_{k=0}^{M-1} \sum_{i=0}^{L-1} c_{l,i+L,k}(a_{l,i} b_{l,k}^H) \end{bmatrix},$$

$A_l = [a_{l,0} \, a_{l,1} \ldots a_{l,L-1}]$, $a_{l,i}$ is a $N_1 N_2 \times 1$ column vector for SD antenna ports where $N_1$ and $N_2$ are number of antenna ports, respectively, with a same antenna polarization in a first and a second dimensions of a two-dimensional dual-polarized CSI-RS antenna ports at the BS; $B_l = [b_{l,0} \, b_{l,1} \, \ldots \, b_{l, M-1}]$, $b_{l,k}$ is a $N_3 \times 1$ column vector for FD units, the 2L×M matrix $C_l$ comprises coefficients $c_{l,i,k}$; and a number (L) of column vectors for the SD antenna ports, a number (M) of column vectors for the FD units, and the total number ($N_3$) of the FD units are configured via higher layer signaling.

In one embodiment, the CSI feedback is partitioned into two parts, CSI part 1 and CSI part 2, CSI part 1 includes the $K^{NZ}$ value and is transmitted via a UL control information (UCI) part 1, and CSI part 2 is transmitted via a UCI part 2, where UCI part 1 and UCI part 2 are parts of a two-part UCI transmitted over the UL channel.

Figure 15:
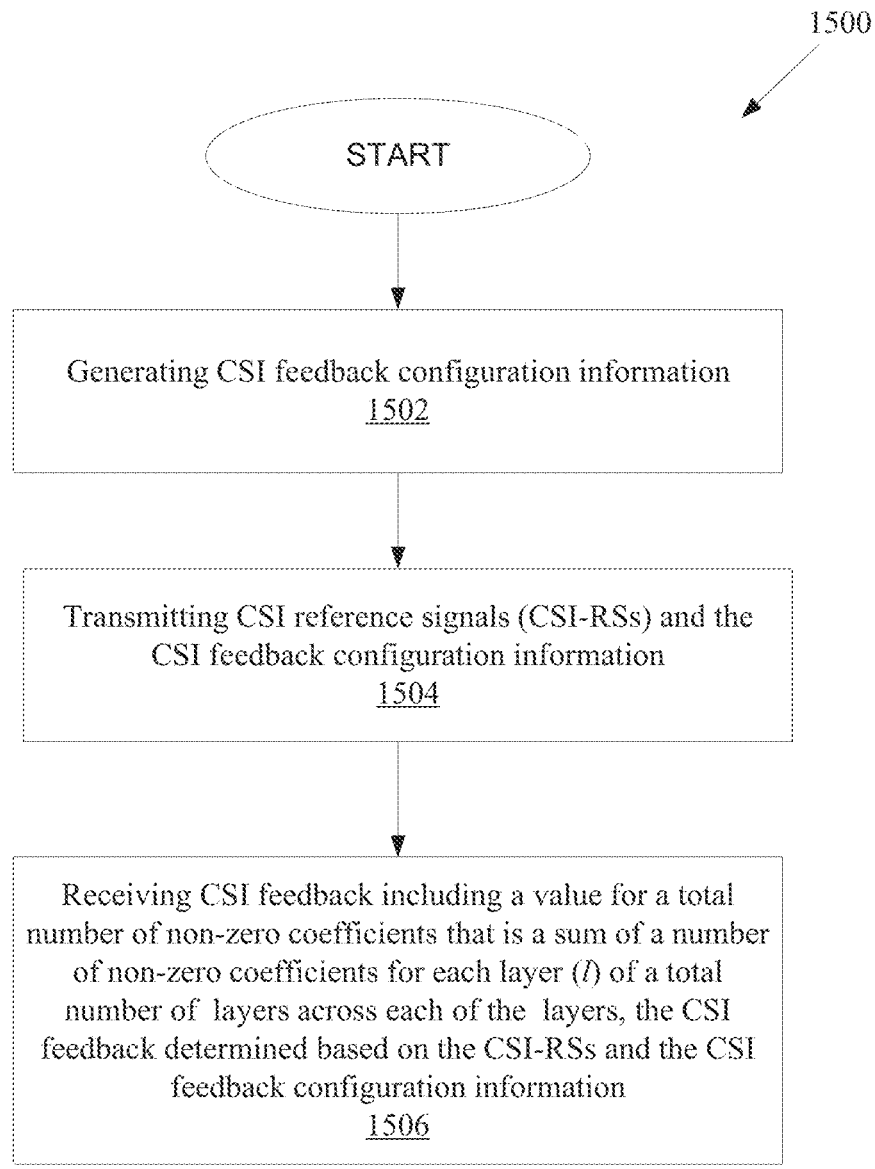
FIG. 15 illustrates a flow chart of another method for receiving an UL transmission including CSI feedback, as may be performed by a BS, according to embodiments of the present disclosure.

FIG. 15 illustrates a flow chart of another method 1500, as may be performed by a base station (BS), according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the BS (e.g., 101-103 as illustrated in FIG. 1), generates CSI feedback configuration information.

In step 1504, the BS transmits, to a user equipment (UE), CSI reference signals (CSI-RS s) and the CSI feedback configuration information.

In step 1506, the BS receives, from the UE over an uplink (UL) channel, a CSI feedback including a value for a total number of non-zero coefficients ($K^{NZ}$) that is a sum of a number of non-zero coefficients ($K_l^{NZ}$) across each layer (l) of a total number of $\upsilon$ layers, where the CSI feedback is based on the CSI-RSs and the CSI feedback configuration information, $K^{NZ} = \sum_{l=1}^{\upsilon} K_l^{NZ}$, $K_l^{NZ}$ is a number of non-zero coefficients for layer l, and $\upsilon \geq 1$ is a rank value.

In one embodiment, a maximum number of non-zero coefficients the UE can report per layer is $K_0$ such that $K_l^{NZ} \leq K_0$.

In one embodiment, the CSI feedback configuration information includes a maximum allowed value for $\upsilon$. When the maximum allowed value for $\upsilon$ is greater than 1, a maximum value for the $K^{NZ}$ the UE can report is $2K_0$ such that $K^{NZ} \leq 2K_0$, and a number of bits for the UE to report the $K^{NZ}$ is $\lceil \log_2(2K_0) \rceil$, where $\lceil \ \rceil$ is a ceiling function.

In one embodiment, the CSI feedback configuration information includes a maximum allowed value for $\upsilon$. When the maximum allowed value for $\upsilon$ is equal to 1, a maximum value for the $K^{NZ}$ the UE can report is $K_0$ such that $K^{NZ} \leq K_0$, and a number of bits for the UE to report the $K^{NZ}$ is $\lceil \log_2(K_0) \rceil$, where $\lceil \ \rceil$ is a ceiling function.

In one embodiment, $K_0 = \lceil \beta \times 2LM \rceil$, where $\lceil \ \rceil$ is a ceiling function, $\beta < 1$ is a higher layer configured parameter, and 2LM is a total number of coefficients for each layer l, where a total of 2LM coefficients form a 2L×M coefficient matrix $C_l$ comprising 2L rows and M columns, the $K_l^{NZ}$ non-zero coefficients correspond to non-zero coefficients of the 2L×M coefficient matrix $C_l$, and the remaining $2LM - K_l^{NZ}$ coefficients of the 2L×M coefficient matrix $C_l$ are zero.

In one embodiment, the CSI feedback includes a precoding matrix indicator (PMI) indicating the 2L×M coefficient matrix $C_l$, a spatial domain (SD) basis matrix $A_l$ and a frequency domain (FD) basis matrix $B_l$ for each l=1, ..., $\upsilon$. A precoding matrix for each FD unit of a total number ($N_3$) of FD units is determined by columns of $$W = \frac{1}{\sqrt{\upsilon}}[W^1 \ W^2 \ ... \ W^\upsilon] \text{ where } W^l =$$

$$\begin{bmatrix} A_l & 0 \\ 0 & A_l \end{bmatrix} C_l B_l^H = \begin{bmatrix} \sum_{k=0}^{M-1}\sum_{i=0}^{L-1} c_{l,i,k}(a_{l,i}b_{l,k}^H) \\ \sum_{k=0}^{M-1}\sum_{i=0}^{L-1} c_{l,i+L,k}(a_{l,i}b_{l,k}^H) \end{bmatrix},$$

$A_l = [a_{l,0} \ a_{l,1} \ ... \ a_{l,L-1}]$, $a_{l,i}$ is a $N_1N_2 \times 1$ column vector for SD antenna ports where $N_1$ and $N_2$ are number of antenna ports, respectively, with a same antenna polarization in a first and a second dimensions of a two-dimensional dual-polarized CSI-RS antenna ports at the BS, $B_l = [b_{l,0} \ b_{l,1} \ ... \ b_{l,M-1}]$, $b_{l,k}$ is a $N_3 \times 1$ column vector for FD units, the 2L×M matrix $C_l$ comprises coefficients $c_{l,i,k}$, and a number (L) of column vectors for the SD antenna ports, a number (M) of column vectors for the FD units, and the total number ($N_3$) of the FD units are configured via higher layer signaling.

In one embodiment, the CSI feedback is partitioned into two parts, CSI part 1 and CSI part 2, CSI part 1 includes the $K^{NZ}$ value and is transmitted via a UL control information (UCI) part 1, and CSI part 2 is transmitted via a UCI part 2, where UCI part 1 and UCI part 2 are parts of a two-part UCI transmitted over the UL channel.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for channel state information (CSI) feedback in a wireless communication system, the UE comprising:

a transceiver configured to receive, from a base station (BS), a CSI reference signal (CSI-RS) and CSI feedback configuration information, wherein the CSI feedback configuration information includes a maximum allowed value of a rank indicator; and at least one processor operably coupled to the transceiver, the at least one processor configured to identify a number of bits for reporting a value of a total number of non-zero coefficients summed across all layers based on the maximum allowed value of the rank indicator, wherein the number of bits for reporting is identified based on a maximum number of non-zero coefficients for one layer or a maximum number of the total number of non-zero coefficients, wherein the transceiver is further configured to transmit, to the BS via an uplink (UL) channel, the CSI feedback based on the CSI-RS, wherein the CSI feedback includes the value for the total number of non-zero coefficients indicated by using the number of bits for reporting.

2. The UE of claim 1, wherein the at least one processor is further configured to:

identify a number of non-zero coefficients for each layer based on the CSI feedback configuration information, and identify the total number of non-zero coefficients for all layers by summing the number of non-zero coefficients for the each layer.

3. The UE of claim 1, wherein the number of bits for reporting corresponds to the maximum number of the total number of non-zero coefficients, in a case that the maximum allowed value of the rank indicator is greater than 1.

4. The UE of claim 1, wherein the number of bits for reporting corresponds to the maximum number of non-zero coefficients for one layer, in a case that the maximum allowed value of the rank indicator is equal to 1.

5. The UE of claim 1, wherein the total number of non-zero coefficients is less than or equal to the maximum number of non-zero coefficients for one layer multiplied by 2.

6. The UE of claim 1, wherein:

the maximum number of non-zero coefficients for one layer is identified based on a total number of coefficients for the one layer and a higher layer parameter, and the higher layer parameter is less than 1.

7. The UE of claim 1, wherein:

the CSI feedback is partitioned into CSI part 1 and CSI part 2, and the CSI feedback including the value for the total number of non-zero coefficients is transmitted via the CSI part 1.

8. A base station (BS) for channel state information (CSI) feedback in a wireless communication system, the BS comprising:

at least one processor configured to generate CSI feedback configuration information, wherein the CSI feedback configuration information includes a maximum allowed value of a rank indicator, a transceiver operably coupled to the at least one processor, the transceiver configured to:

transmit, to a user equipment (UE), a CSI reference signal (CSI-RS) and the CSI feedback configuration information, and receive, from the UE via uplink (UL) channel, the CSI feedback based on the CSI-RS, wherein the CSI feedback includes a value of a total number of non-zero coefficients indicated by using a number of bits for reporting, wherein the number of bits for reporting the value of the total number of non-zero coefficients summed across all layers is identified based on the maximum allowed value of the rank indicator, and wherein the number of bits for reporting is identified based on a maximum number of non-zero coefficients for one layer or a maximum number of the total number of non-zero coefficients.

9. The BS of claim 8, wherein the total number of non-zero coefficients for all layers is obtained by summing a number of non-zero coefficients for each layer, and wherein the number of non-zero coefficients for each layer is identified based on the CSI feedback configuration information.

10. The BS of claim 8, wherein the number of bits for reporting corresponds to the maximum number of the total number of non-zero coefficients, in a case that the maximum allowed value of the rank indicator is greater than 1.

11. The BS of claim 8, wherein the number of bits for reporting corresponds to the maximum number of non-zero coefficients for one layer, in a case that the maximum allowed value of the rank indicator is equal to 1.

12. The BS of claim 8, wherein the total number of non-zero coefficients is less than or equal to the maximum number of non-zero coefficients for one layer multiplied by 2.

13. The BS of claim 8, wherein:

the maximum number of non-zero coefficients for one layer is identified based on a total number of coefficients for the one layer and a higher layer parameter, and the higher layer parameter is less than 1.

14. The BS of claim 8, wherein:

the CSI feedback is partitioned into CSI part 1 and CSI part 2, and the CSI feedback including the value for the total number of non-zero coefficients is transmitted via the CSI part 1.

15. A method for operating a user equipment (UE) for channel state information (CSI) feedback in a wireless communication system, the method comprising:

receiving, from a base station (BS), a CSI reference signal (CSI-RS) and CSI feedback configuration information, wherein the CSI feedback configuration information includes a maximum allowed value of a rank indicator;

identifying a number of bits for reporting a value of a total number of non-zero coefficients summed across all layers based on the maximum allowed value of the rank indicator, wherein the number of bits for reporting is identified based on a maximum number of non-zero coefficients for one layer or a maximum number of the total number of non-zero coefficients; and transmitting, to the BS via an uplink (UL) channel, the CSI feedback based on the CSI-RS, wherein the CSI feedback includes the value for the total number of non-zero coefficients indicated by using the number of bits for reporting.

16. The method of claim 15, further comprising:

identifying a number of non-zero coefficients for each layer based on the CSI feedback configuration information; and identifying the total number of non-zero coefficients for all layers by summing the number of non-zero coefficients for the each layer.

17. The method of claim 15, wherein the number of bits for reporting corresponds to the maximum number of the total number of non-zero coefficients, in a case that the maximum allowed value of the rank indicator is greater than 1.

18. The method of claim 15, wherein the number of bits for reporting corresponds to the maximum number of non-zero coefficients for one layer, in a case that the maximum allowed value of the rank indicator is equal to 1.

19. The method of claim 15, wherein the total number of non-zero coefficients is less than or equal to the maximum number of non-zero coefficients for one layer multiplied by 2.

20. The method of claim 15, wherein:

the maximum number of non-zero coefficients for one layer is identified based on a total number of coefficients for the one layer and a higher layer parameter, and the higher layer parameter is less than 1.

* * * * *